United States Patent [19]

Kubo

[11] Patent Number: 4,669,046
[45] Date of Patent: May 26, 1987

[54] METHOD AND SYSTEM FOR DERIVING WHEEL ROTATION SPEED DATA FOR AUTOMOTIVE ANTI-SKID CONTROL

[75] Inventor: Jun Kubo, Hino, Japan

[73] Assignee: Nissan Motor Company, Limited, Yokohama, Japan

[21] Appl. No.: 601,318

[22] Filed: Apr. 17, 1984

[30] Foreign Application Priority Data

May 16, 1983 [JP] Japan ............................ 58-84082

[51] Int. Cl.[4] ............................................. B60T 8/34
[52] U.S. Cl. ............................... 364/426; 364/565; 303/95; 303/105; 303/92; 324/166
[58] Field of Search .............. 364/424, 426, 565, 566; 303/95, 92, 105-109; 361/238; 324/160-162, 166

[56] References Cited

U.S. PATENT DOCUMENTS

| | | | |
|---|---|---|---|
| 2,914,359 | 11/1959 | Yarber | 303/24 B |
| 3,398,995 | 8/1968 | Martin | 303/105 |
| 3,503,653 | 3/1970 | Davis et al. | 303/95 |
| 3,637,264 | 1/1972 | Leiber et al. | 303/105 |
| 3,752,536 | 8/1973 | Machek | 303/115 |
| 3,880,474 | 4/1975 | Scharlack | 303/106 |
| 3,930,688 | 1/1976 | Rau et al. | 364/426 |
| 3,938,612 | 2/1976 | Boudeville et al. | 364/426 |
| 3,943,345 | 3/1976 | Ando et al. | 364/566 |
| 3,985,396 | 10/1976 | Kuwana et al. | 364/426 |
| 4,267,575 | 5/1981 | Bounds | 364/426 |
| 4,270,176 | 5/1981 | Skarvada | 364/426 |
| 4,315,213 | 2/1982 | Wolff | 364/565 |
| 4,335,431 | 6/1982 | Takahashi | 364/426 |
| 4,384,330 | 5/1983 | Matsuda | 364/426 |
| 4,398,260 | 8/1983 | Takahashi et al. | 364/426 |
| 4,408,290 | 10/1983 | Kubo et al. | 364/566 |
| 4,409,664 | 10/1983 | Skarvada | 364/565 |
| 4,420,814 | 12/1983 | Arikawa et al. | 364/426 |
| 4,430,714 | 2/1984 | Matsuda et al. | 364/426 |
| 4,435,768 | 3/1984 | Arikawa | 303/105 |
| 4,497,026 | 1/1985 | Braschel et al. | 364/426 |
| 4,569,560 | 2/1986 | Kubo | 303/92 |

FOREIGN PATENT DOCUMENTS

| | | |
|---|---|---|
| 51-89096 | 8/1976 | Japan . |
| 55-28900 | 7/1980 | Japan . |
| 56-100363 | 8/1981 | Japan . |

Primary Examiner—Gary Chin
Attorney, Agent, or Firm—Schwartz, Jeffery, Schwaab, Mack, Blumenthal & Evans

[57] ABSTRACT

An anti-skid control system includes a wheel speed calculation in which newly derived wheel speed is compared with a wheel speed derived at an immediately preceding calculation. When the newly derived instant wheel speed is different from the previously derived old wheel speed beyond a predetermined value which is variable in dependent upon variation of the wheel speed derived at the immediately preceding calculation. A back-up signal is derived and output as a replacement of wheel speed data. The back-up signal may have a value substantially corresponding to a wheel speed data avoiding error component in the instant wheel speed.

23 Claims, 23 Drawing Figures

METHOD AND SYSTEM FOR DERIVING WHEEL ROTATION SPEED DATA FOR AUTOMOTIVE ANTI-SKID CONTROL

BACKGROUND OF THE INVENTION

The present invention relates generally to an anti-skid brake control system for an automotive vehicle, which controls braking pressure in order to optimize braking characteristics. More particularly, the invention relates to a method and system for deriving a peripheral speed of a vehicle wheel.

As is well known, in anti-skid control, the braking force applied to wheel cylinders is so adjusted that the peripheral speed of the wheels during braking is held to a given ratio, e.g. 80%, of the vehicle speed. Such a practice has been believed to be effective, especially when road conditions and other factors are taken into consideration. Throughout the accompanying disclosure, the ratio of wheel peripheral speed to vehicle speed will be referred to as "slip rate" or "slip ratio".

U.S. Pat. No. 4,267,575, issued on May 12, 1981 to Peter BOUNDS, discloses a system, which serves to provide signals to a microcomputer-based control system from which instantaneous values of speed can be computed. The disclosure includes a wheel-driven alternator which provides an alternating current output whose frequency varies with wheel speed. A signal processor converts this signal to a series of sensor pulses whose width varies inversely with frequency. A sample pulse supplied by a microprocessor sets the period or length of time during which the sensor pulses are examined for each speed calculation cycle of the microprocessor. The sample period pulses are AND-gated with a high-frequency clock signal and also with the sensor pulses to provide a series of marker pulses marking the up and down excursions of the sensor pulses. The marker pulses occurring in each sample period are counted directly in a first counter, and in addition are supplied to a latch circuit and from thence to an AND gate which responds to the first marker pulse in the sample period to count occurrences of the first counter exceeding its capacity. A third counter is also connected to receive the high-frequency clock pulses and counts only the clock pulses occurring after the last marker pulse in the sample period. At the end of the sample period, the counts from all three counters are transferred to the microprocessor which uses this information to compute a value for wheel velocity over the sample period. The system continuously provided the input counts to enable the microprocessor to calculate wheel velocity over each sample period.

In addition, U.S. Pat. No. 4,315,213, issued on Feb. 9, 1982 to Manfred WOLFF, discloses a method for obtaining an acceleration or deceleration signal from a signal proportional to speed and apparatus therefor. The method for obtaining an acceleration or deceleration signal from a signal proportional to the speed consists of storing the n most recently ascertained changes in the speed signal in a memory, and upon ascertainment of a new change to be stored in memory, erasing the change which has been stored the longest, and forming a deceleration or acceleration signal by addition of the stored n changes periodically at intervals of dT. In this method, the occurrence of deceleration or acceleration exceeding the threshold is recognized quickly.

In another approach, U.S. Pat. No. 4,384,330 to Toshiro MATSUDA, issued on May 17, 1983 discloses a brake control system for controlling application and release of brake pressure in order to prevent the vehicle from skidding. The system includes a sensing circuit for determining wheel rotation speed, a deceleration detecting circuit for determining the deceleration rate of the wheel and generating a signal when the determined deceleration rate becomes equal to or greater than a predetermined value, a target wheel speed circuit for determining a target wheel speed based on the wheel rotation speed and operative in response to detection of a peak in the coefficient of friction between the vehicle wheel and the road surface, and a control circuit for controlling application and release of brake fluid pressure to wheel cylinders for controlling the wheel deceleration rate. The wheel rotation speed sensing circuit detects the angular velocity of the wheel to produce alternating current sensor signal having a frequency corresponding to the wheel rotation speed. The wheel rotation speed sensor signal value is differentiated to derive the deceleration rate.

Another approach for deriving acceleration has been disclosed in U.S. Pat. No. 3,943,345 issued on Mar. 9, 1976 to Noriyoshi ANDO et al. The system disclosed includes a first counter for counting the number of pulse signals corresponding to the rotational speed of a rotating body, a second counter for counting the number of pulses after the first counter stops counting, and a control circuit for generating an output signal corresponding to the difference between the counts of the first and second counters.

In the present invention, another approach has been taken to derive the wheel rotation speed which will be hereafter referred to as "wheel speed" based on input time data representative of the times at which wheel speed sensor signal pulses are produced. For instance, by latching a timer signal value in response to the leading edge of each sensor signal pulse, the intervals between occurrences of the sensor signal pulses can be measured. The intervals between occurrences of the sensor signal pulses are inversely proportional to the rotation speed of the wheel. Therefore, wheel speed can be derived by finding the reciprocal of the measured intervals. In addition, wheel acceleration and deceleration can be obtained by comparing successive intervals and dividing the obtained difference between intervals by the period of time over which the sensor signals were sampled.

To perform this procedure, it is essential to record the input timing in response to every sensor signal pulse. A difficulty is encountered due to significant variations in the sensor signal intervals according to significant variations in the vehicle speed. In recent years, modern vehicles can be driven at speeds in the range of about 0 km to 300 km. Sensor signal intervals vary in accordance with this wide speed range. In particular, when the vehicle is moving at a relatively high speed, the input intervals of the sensor signal pulses may be too short for the anti-skid control system to resolve. As accurate sampling of input timing is essential for the proposed approach, errors in the recorded input time data will cause errors or malfunction of the anti-skid brake control system. One possible source of error in sampling the input timing is accidentally missing one or more sensor signal pulses. Such errors are particularly likely to occur when the vehicle and wheel speeds are relatively high and therefore the intervals between adjacent sensor signal pulses are quite short.

U.S. Pat. No.4,408,290, issued on Oct. 4, 1983 to the common inventor of this invention is intended to perform the foregoing input time data sampling for use in calculation of acceleration and deceleration. In the disclosure of the applicant's prior invention, an acceleration sensor acts on the variable-frequency pulses of a speed sensor signal to recognize any variation of the pulse period thereof and to produce an output indicative of the magnitude of the detected variation to within a fixed degree of accuracy. The duration of groups of pulses are held to within a fixed range by adjusting the number of pulses in each group. The duration of groups of pulses are measured with reference to a fixed-frequency clock pulse signal and the measurement periods of successive groups of equal numbers of pulses are compared. If the difference between pulse group periods is zero or less than a predetermined value, the number of pulses in each group is increased in order to increase the total number of clock pulses during the measurement interval. The number of pulses per group is increased until the difference between measured periods exceeds the predetermined value or until the number of pulses per group reaches a predetermined maximum. Acceleration data calculations and memory control procedures are designed to take into account the variation of the number of pulse per group.

In order to perform operations with applicant's prior invention, a wheel speed sensor means is employed for producing a sequence of sensor signal pulses having intervals representative of wheel speed. The sensor signal pulse intervals tends to fluctuate at significant levels to cause errors in the calculation of wheel speed. Such errors in calculation of wheel speed may affect the anti-skid control operation.

SUMMARY OF THE INVENTION

Therefore, it is an object of the present invention to provide an anti-skid control system which can avoid significant error in wheel speed data calculation and thereby improve accuracy or reliability of the system.

Another and more specific object of the present invention is to provide an anti-skid brake control system including means for detecting errors in wheel speed data and for producing a back-up signal having a value corresponding to an approximate wheel speed without an error component.

In order to accomplish the above-mentioned and other objects, an anti-skid control system, according to the present invention, includes a wheel speed calculation in which newly derived wheel speed is compared with a wheel speed derived at an immediately preceding calculation. When the newly derived wheel speed is different from the previously derived old wheel speed beyond a predetermined value (which is variable dependent upon the variation of the wheel speed derived at the immediately preceding calculation), a back-up signal is produced and output as a replacement of the wheel speed data. The back-up signal may have a value substantially corresponding to wheel speed data without an error component found in the current wheel speed calculation.

Preferably, the predetermined values to be compared with the difference of the newly derived wheel speed and the wheel speed derived at the immediately preceding calculation are stored in a memory in a form of a look up table to be read in terms of the previously derived wheel speed or are adapted to be derived as a function of the previously derived wheel speed.

The old wheel speed data may be taken as the back-up signal value to be replaced with the instant wheel speed value. Further, the back-up signal value may be derived based on the old wheel speed data and wheel acceleration or deceleration derived at a timing corresponding to deriving of the old wheel speed.

BRIEF DESCRIPTION OF THE DRAWINGS

The present invention will be understood more fully from the detailed description given below and from the accompanying drawings of the preferred embodiments of the present invention, which, however, should not be taken to limit the invention to the specific embodiments, but are for explanation and understanding only.

DESCRIPTION OF THE PREFERRED EMBODIMENTS

Figure 1:
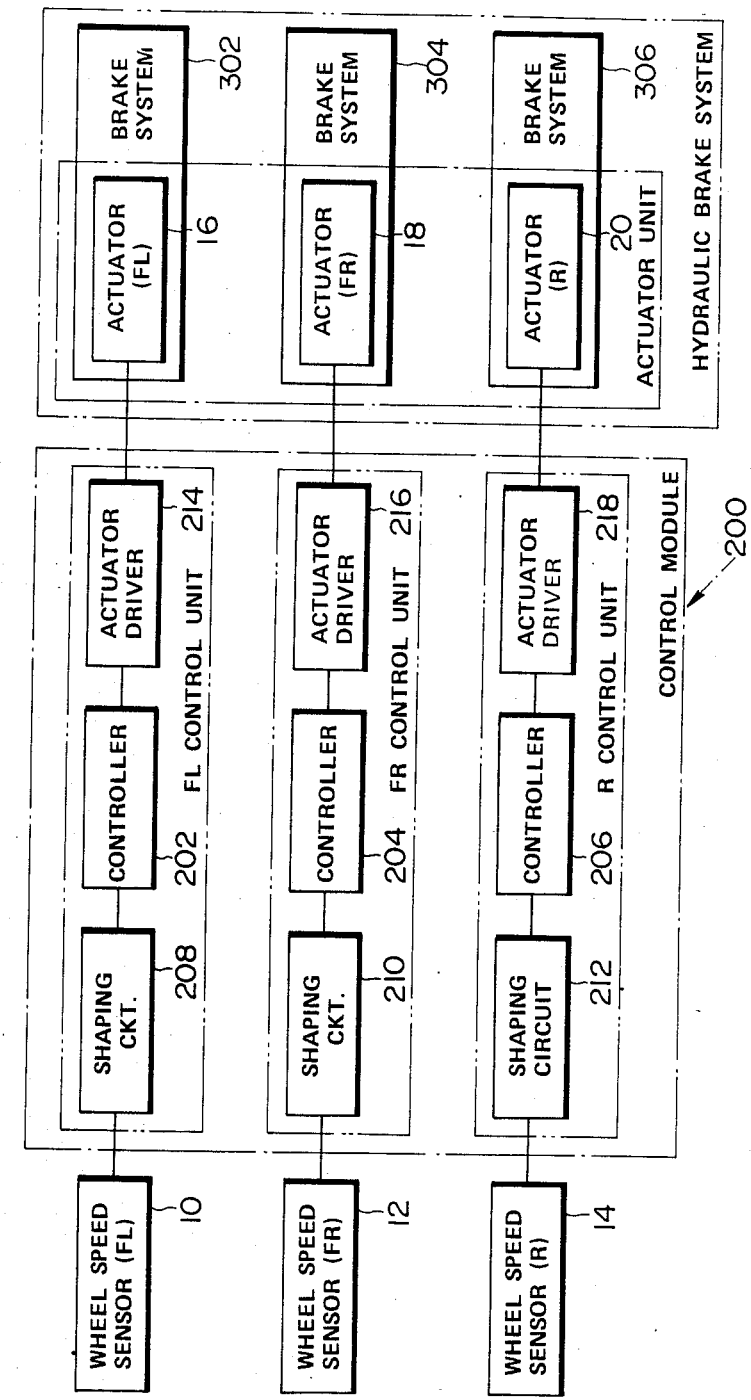
FIG. 1 is a schematic block diagram of the general design of the preferred embodiment of an anti-skid brake control system according to the present invention.

This application is one of eighteen mutually related co-pending Patent Applications in the United States, filed on the same day. All of the eighteen applications have been filed by the common applicant to this application and commonly assigned to the assignee of this application. The other seventeen applications are identified below:

| Basic Japanese Patent Appln. No. | Serial No. | Title of the Invention |
|---|---|---|
| Showa 58-70891 | 601,326 | AN AUTOMOTIVE ANTI-SKID BRAKE CONTROL SYSTEM WITH SAMPLING INPUT TIME DATA OF WHEEL SPEED SENSOR SIGNALS |
| Showa 58-70892 (filed April 23, 1983) | 601,375 | METHOD AND SYSTEM FOR SAMPLING INPUT TIME DATA FOR WHEEL SPEED SENSOR IN AN AUTOMOTIVE ANTI-SKID BRAKE CONTROL SYSTEM |
| Showa 58-70893 (filed April 23, 1983) | 601,325 | AUTOMOTIVE ANTI-SKID CONTROL SYSTEM WITH CONTROL OF SAMPLING OF INPUT TIME DATA OF WHEEL SPEED SENSOR SIGNALES AND METHOD THEREFOR |
| Showa 58-70894 (filed April 23, 1983) | 601,317 | ANTI-SKID CONTROL SYSTEM FOR AUTOMOTIVE BRAKE SYSTEM WITH SAMPLE CONTROL FOR SAMPLING INPUT TIMING OF SENSOR SIGNAL PULSES WITH REQUIRED PROCESS IDENTIFICATION AND METHOD FOR SAMPLING |
| Showa 58-70895 (filed April 23, 1983) | 601,294 | ANTI-SKID BRAKE CONTROL SYSTEM INCLUDING A PROCEDURE OF SAMPLING OF INPUT TIME DATA OF WHEEL SPEED SENSOR SIGNALS AND METHOD THEREFOR |
| Showa 58-70896 (filed April 23, 1983) | 601,344 | ANTI-SKID BRAKE CONTROL SYSTEM INCLUDING WHEEL DECELERATION CALCULATION WITH SHORTER LAG-TIME AND METHOD FOR PERFORMING CALCULATION |
| Showa 58-70897 (filed April 23, 1983) | 601,338 | ANTI-SKID BRAKE CONTROL SYSTEM WITH SAMPLE CONTROL OF SENSOR SIGNAL INPUT TIME DATA, AND METHOD THEREFOR |
| Showa 58-70898 (filed April 23, 1983) | 601,337 | ANTI-SKID BRAKE CONTROL SYSTEM WITH CONTROL OF SAMPLING TIMING OF INPUT TIMING VALUES OF WHEEL SPEED SENSOR SIGNAL PULSES |
| Showa 56-70899 (filed April 23, 1983) | 601,330 | ANTI-SKID BRAKE CONTROL SYSTEM FOR AUTOMOTIVE VEHICLE |
| Showa 58-70900 (filed April 23, 1983) | 601,364 | ANTI-SKID BRAKE CONTROL SYSTEM WITH REDUCED DURATION OF WHEEL ACCELERATION AND DECELERATION CALCULATION |
| Showa 58-84088 (filed May, 16 1983) | 601,363 | ANTI-SKID BRAKE CONTROL SYSTEM WITH OPERATIONAL MODE CONTROL AND METHOD THEREFOR |
| Showa 58-84087 & 58-84091 (both filed May 16, 1983) | 601,329 | ANTI-SKID BRAKE CONTROL SYSTEM WITH OPERATION CONTROL FOR A PRESSURE REDUCTION FLUID PUMP IN HYDRAULIC BRAKE CIRCUIT |
| Showa 58-84085 (filed May 16, 1983) | 601,345 | METHOD AND SYSTEM FOR DERIVING WHEEL ACCELERATION AND DECELERATION IN AUTOMOTIVE ANTI-SKID BRAKE CONTROL SYSTEM |
| Showa 58-84092 (filed May, 16 1983) | 601,293 | ANTI-SKID BRAKE CONTROL SYSTEM AND METHOD FEATURING VEHICLE BATTERY PROTECTION |
| Showa 58-84081 (filed May, 16 1983) | 601,327 | METHOD AND SYSTEM FOR DERIVING WHEEL ROTATION SPEED DATA FOR AUTOMOTIVE ANTI-SKID CONTROL |
| Showa 58-84090 (filed May, 16 1983) | 601,258 | ANTI-SKID BRAKE CONTROL SYSTEM INCLUDING FLUID PUMP AND DRIVE CIRCUIT THEREFOR |
| Showa 58-102919 & 58-109308 (respectively filed june 10, 1983 & June 20, 1983) | 601,295 | ANTI-SKID BRAKE CONTROL SYSTEM WITH A PLURALITY OF INDEPENDENTLY OPERATIVE DIGITAL CONTROLLERS |

Disclosures of other seventeen applications as identified above are hereby incorporated by reference.

Referring now to the drawings, particularly to FIG. 1, the preferred embodiment of an anti-skid control system according to the present invention includes a control module 200 including a front-left controller unit (FL) 202, a front-right controller unit (FR) 204 and a rear controller unit (R) 206. The controller unit 202 comprises a microprocessor and is adapted to control brake pressure applied to a front left wheel cylinder 30a of a front left hydraulic brake system 302 of an automotive hydraulic brake system. Similarly, the controller unit 204 is adapted to control brake pressure applied to the wheel cylinder 34a of a front right wheel (not shown) in the front right hydraulic brake system 304 and the controller unit 206 is adapted to control brake pressure applied to the rear wheel cylinders 38a of the hydraulic rear brake system 306. Respective brake systems 302, 304 and 306 have electromagnetically operated actuators 16, 18 and 20, each of which controls the pressure of working fluid in the corresponding wheel cylinders. By means of the controlled pressure, the wheel cylinders 30a, 34a and 38a apply braking force to brake disc rotors 28, 32 and 36 mounted on the corresponding wheel axles for rotation with the corresponding vehicle wheels via brake shoe assemblies 30, 34 and 38.

Though the shown brake system comprises disc brakes, the anti-skid control system according to the present invention can also be applied to drum-type brake systems.

The controller units 202, 204 and 206 are respectively associated with actuator drive circuits 214, 216 and 218 to control operations of corresponding actuators 16, 18 and 20. In addition, each of the controller units 202, 204 and 206 is connected to a corresponding wheel speed sensor 10, 12 and 14 via shaping circuits 208, 210 and 212 incorporated in the controller 200. Each of the wheel speed sensors 10, 12 and 14 is adapted to produce an alternating-current sensor signal having a frequency related to or proportional to the rotation speed of the corresponding vehicle wheel. Each of the A-C sensor signals is converted by the corresponding shaping circuit 208, 210 and 212 into a rectangular pulse signal which will be hereafter referred to as "sensor pulse signal". As can be appreciated, since the frequency of the A-C sensor signals is proportional to the wheel speed, the frequency of the sensor pulse signal should correspond to the wheel rotation speed and the pulse intervals thereof will be inversely proportional to the wheel rotation speed.

The controller units 202, 204 and 206 operate independently and continuously process the sensor pulse signal to derive control signals for controlling the fluid pressure in each of the wheel cylinders 30a, 34a and 38a in such a way that the slip rate R at each of the vehicle wheels is optimized to shorten the distance required to stop the vehicle, which distance will be hereafter referred to as "braking distance".

In general, each controller unit 202, 204 and 206 monitors receipt of the corresponding sensor pulses so that it can derive the pulse interval between the times of receipt of successive sensor pulses. Based on the derived pulse interval, the controller units 202, 204 and 206 calculate instantaneous wheel speed and instantaneous wheel acceleration or deceleration. From these measured and derived values, a target wheel speed $V_i$ is derived. Based on the difference between the instantaneous wheel speed $V_w$ and the target wheel speed $V_i$, a slip rate R is derived. The controller units 202, 204 and 206 determine the appropriate operational mode for increasing, decreasing or holding constant the hydraulic brake pressure applied to the wheel cylinders 30a, 34a and 38a. The control mode in which the brake pressure is increased will be hereafter referred to as "application mode". The control mode in which the brake pressure is decreased will be hereafter referred to as "release mode". The mode in which the brake pressure is held essentially constant will be hereafter referred to as "hold mode". The anti-skid control operation consists of a loop of the application mode, hold mode, release mode and hold mode. This loop is repeated throughout the anti-skid brake control operation cyclically. One cycle of the loop of the control variation will hereafter be referred to as a "skid cycle".

Figure 2:
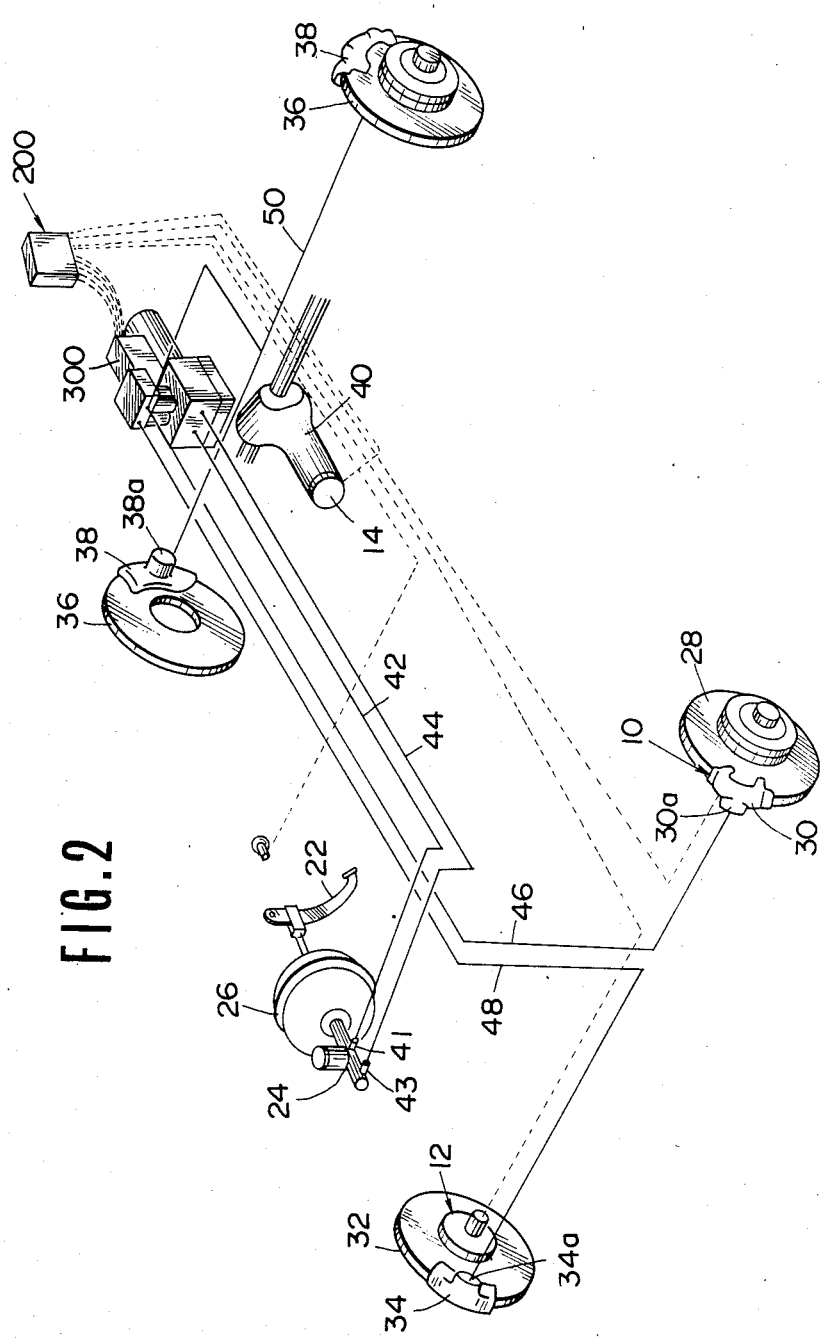
FIG. 2 is a perspective illustration of the hydraulic circuits of the anti-skid brake system according to the present invention.

FIG. 2 shows portions of the hydraulic brake system of an automotive vehicle to which the preferred embodiment of the anti-skid control system is applied. The wheel speed sensors 10 and 12 are respectively mounted on the brake disc rotor 28 and 32 for rotation therewith so as to produce sensor signals having frequencies proportional to the wheel rotation speed and variable in accordance with variation of the wheel speed. On the other hand, the wheel speed sensor 14 is mounted on a propeller shaft near the differential gear box or drive pinion shaft 116 for rotation therewith. Since the rotation speeds of the left and right rear wheels are free to vary independently depending upon driving conditions due to the effect of the differential gear box 40, the rear wheel detected by the rear wheel speed sensor 14 is the average of the speeds of the left and right wheels. Throughout the specification, "rear wheel speed" will mean the average rotation speed of the left and right rear wheels.

As shown in FIG. 2, the actuator unit 300 is connected to a master brake cylinder 24 via primary and secondary outlet ports 41 and 43 thereof and via pressure lines 42 and 44. The master brake cylinder 24 is, in turn, associated with a brake pedal 22 via a power booster 26 which is adapted to boost the braking force applied to the brake pedal 22 before applying same to the master cylinder. The actuator unit 300 is also connected to wheel cylinders 30a, 34a and 38a via brake pressure lines 46, 48 and 50.

Figure 3:
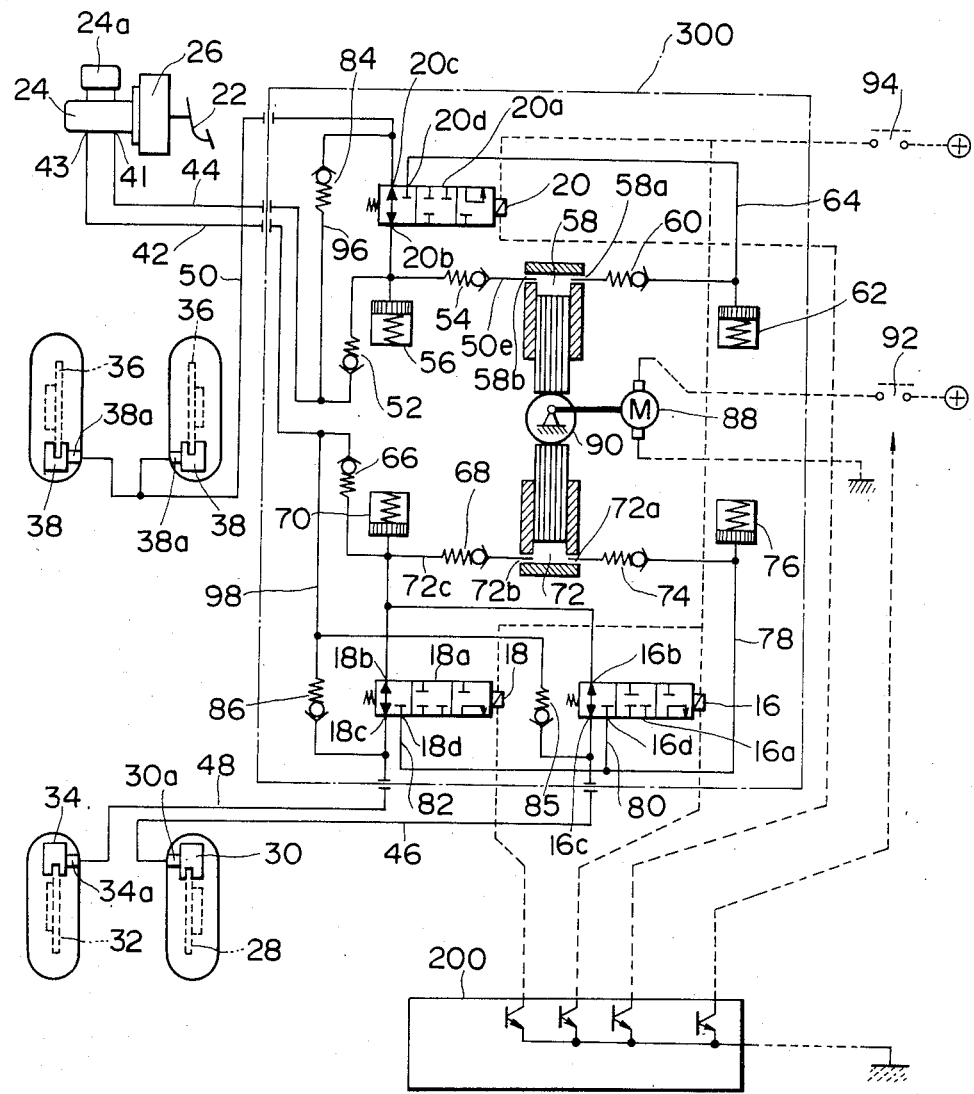
FIG. 3 is a circuit diagram of the hydraulic circuits performing the anti-skid control according to the present invention.

The circuit lay-out of the hydraulic brake system circuit will be described in detail below with reference to FIG. 3 which is only an example of the hydraulic brake system to which the preferred embodiment of the anti-skid control system according to the present invention can be applied, and so it should be appreciated that it is not intended to limit the hydraulic system to the shown embodiment. In FIG. 3, the secondary outlet port 43 is connected to the inlet ports 16b and 18b of electromagnetic flow control valves 16a and 18a, the respective outlet ports 16c and 18c of which are connected to corresponding left and right wheel cylinders 30a and 34a, via the secondary pressure line 42. The primary outlet port 41 is connected to the inlet port 20b of the electromagnetic valve 20a, the outlet port 20c of which is connected to the rear wheel cylinders 38a, via the primary pressure line 44. The electromagnetic valves 16a, 18a and 20a also have drain ports 16d, 18d and 20d. The drain ports 16d and 18d are connected to the inlet port 72a of a fluid pump 90 via drain passages 80, 82 and 78. The fluid pump 90 is associated with an electric motor 88 to be driven by the latter which is, in turn, connected to a motor relay 92, the duty cycle of which is controlled by means of a control signal from the control module 200. While the motor relay 92 is energized to be turned ON, the motor 88 is in operation to drive the fluid pump 90. The drain port 20d of the electromagnetic flow control valve 20a is connected to the inlet port 58a of the fluid pump 90 via a drain passage 64.

The outlet ports 72b and 58b are respectively connected to the pressure lines 42 and 44 via a return passages 72c and 58c. The outlet ports 16c, 18c and 20c of respective electromagnetic flow control valves 16a, 18a and 20a are connected to corresponding wheel cylinders 30a, 34a and 38a via braking lines 46, 48 and 50. Bypass passages 96 and 98 are provided to connect the braking pressure lines 46 and 48, and 50 respectively to the pressure lines 42 and 44, bypassing the electromagnetic flow control valves.

Pump pressure check valves 52 and 66 are installed in the pressure lines 42 and 44. Each of the pump pressure cut valves 66 and 52 is adapted to prevent the working fluid pressurized by the fluid pump 90 from transmitting pressure surges to the master cylinder 24. Since the fluid pump 90 is designed for quick release of the braking pressure in the braking pressure lines 46, 48 and 50 and thus releasing the wheel cylinders 30a, 34a and 38a from the braking pressure, it is driven upon release of the brake pedal. This would result in pressure surges in the working fluid from the fluid pump 90 to the master cylinder 24 if the pump pressure check valves 66 and 52 were not provided. The pump pressure check valves 66 and 52 serve as one-way check valves allowing fluid flow from the master cylinder 24 to the inlet ports 16b, 18b and 20b of the electromagnetic valves 16a, 18a and 20a. Pressure accumulators 70 and 56 are installed in the pressure lines 42 and 44, which pressure accumulators serve to accumulate fluid pressure generated at the outlet ports 72a and 58b of the fluid pump 90 while the inlet ports 16b, 18b and 20b are closed. Toward this end, the pressure accumulators 70 and 56 are connected to the outlet ports 72b and 58b of the fluid pump 90 via the return passages 72c and 58c. Outlet valves 68 and 54 are one-way check valves allowing one-way fluid communication from the fluid pump to the pressure accumulators. These outlet valves 68 and 54 are effective for preventing the pressure accumulated in the pressure accumulators 70 and 56 from surging to the fluid pump when the pump is deactivated. In addition, the outlet valves 68 and 54 are also effective to prevent the pressurized fluid flowing through the pressure lines 42 and 44 from flowing into the fluid pump 90 through the return passages 72 and 58c.

Inlet valves 74 and 60 are inserted in the drain passages 78 and 64 for preventing surge flow of the pressurized fluid in the fluid pump 90 to the electromagnetic flow control valves 16a, 18a and 20a after the braking pressure in the wheel cylinders is released. The fluid flowing through the drain passages 78 and 64 is temporarily retained in fluid reservoirs 76 and 62 connected to the former.

Bypass check valves 86 and 84 are inserted in the bypass passages 98 and 96 for preventing the fluid in the pressure lines 42 and 44 from flowing to the braking pressure lines 46, 48 and 50 without first passing through the electromagnetic flow control valves 16a, 18a and 20a. On the other hand, the bypass valves 86 and 84 are adapted to permit fluid flow from the braking pressure line 46, 48 and 50 to the pressure lines 42 and 44 when the master cylinder 24 is released and thus the line pressure in the pressure lines 42 and 44 becomes lower than the pressure in the braking pressure lines 46, 48 and 50.

Figure 4:
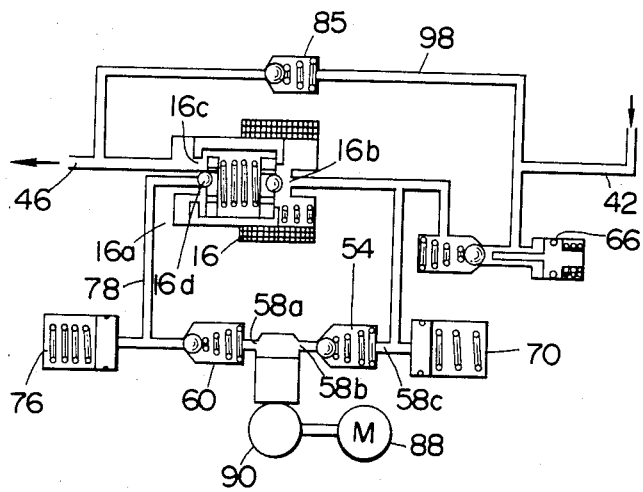
FIG. 4 is an illustration of the operation of an electromagnetic flow control valve employed in the hydraulic circuit, which valve has been shown in an application mode for increasing the fluid pressure in a wheel cylinder.
Figure 5:
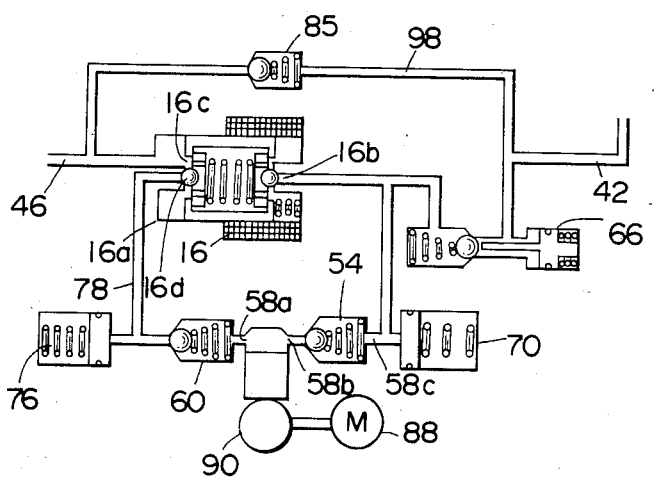
FIG. 5 is a view similar to FIG. 4 but of the valve in a hold mode in which the fluid pressure in the wheel cylinder is held at a substantially constant value.
Figure 6:
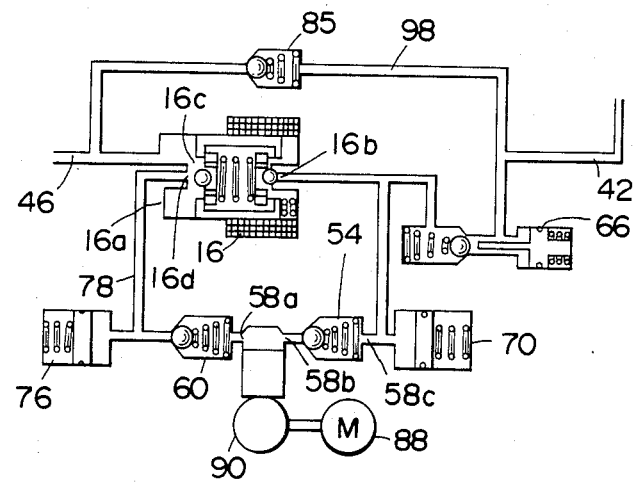
FIG. 6 is a view similar to FIG. 4 but of the valve in a release mode in which the fluid pressure in the wheel cylinder is reduced.

The electromagnetic flow control valves 16a, 18a and 20a are respectively associated with the actuators 16, 18 and 20 to be controlled by means of the control signals from the control module 200. The actuators 16, 18 and 20 are all connected to the control module 200 via an actuator relay 94, which thus controls the energization and deenergization of them all. Operation of the electromagnetic valve 16a in cooperation with the actuator 16 will be illustrated with reference to FIGS. 4, 5 and 6, in particular illustrating application mode, hold mode and release mode, respectively.

It should be appreciated that the operation of the electromagnetic valves 18a and 20a are substantially the same as that of the valve 16a. Therefore, disclosure of the valve operations of the electromagnetic valves 18a and 20a is neglected in order to avoid unnecessary repetition and for simplification of the disclosure.

APPLICATION MODE

In this position, the actuator 16 remains deenergized. An anchor of the electromagnetic valve 16a thus remains in its initial position allowing fluid flow between the inlet port 16b and the outlet port 16c so that the pressurized fluid supplied from the master cylinder 24 via the pressure line 42 may flow to the left front wheel cylinder 30a via the braking pressure line 46. In this valve position, the drain port 16d is closed to block fluid flow from the pressure line 42 to the drain passage 78. As a result, the line pressure in the braking pressure line 46 is increased in proportion to the magnitude of depression of the brake pedal 22 and thereby the fluid pressure in the left front wheel cylinder 30a is increased correspondingly.

In this case, when the braking force applied to the brake pedal is released, the line pressure in the pressure line 42 drops due to return of the master cylinder 24 to its initial position. As a result, the line pressure in the braking pressure line 46 becomes higher than that in the pressure line 42 and so opens the bypass valve 85 to permit fluid flow through the bypass passage 98 to return the working fluid to the fluid reservoir 24a of the master cylinder 24.

In the preferring construction, the pump pressure check valve 66, normally serving as a one-way check valve for preventing fluid flow from the electromagnetic valve 16a to the master cylinder 24, becomes wide-open in response to drop of the line pressure in the pressure line below a given pressure. This allows the fluid in the braking pressure line 46 to flow backwards through the electromagnetic valve 16a and the pump pressure check valve 66 to the master cylinder 24 via the pressure line 42. This function of the pump pressure check valve 66 facilitates full release of the braking pressure in the wheel cylinder 30a.

For instance, the bypass valve 85 is rated at a given set pressure, e.g. 2 kg/cm$^2$ and closes when the pressure difference between the pressure line 42 and the braking pressure line 46 drops below the set pressure. As a result, fluid pressure approximating the bypass valve set pressure tends to remain in the braking pressure line 46, preventing the wheel cylinder 30a from returning to the fully released position. In order to avoid this, in the shown embodiment, the one-way check valve function of the pump pressure check valve 66 is disabled when the line pressure in the pressure line 42 drops below a predetermined pressure, e.g. 10 kg/cm$^2$. When the line pressure in the pressure line 42 drops below the predetermined pressure, a bias force normally applied to the pump pressure check valve 66 is released, freeing the valve to allow fluid flow from the braking pressure line 46 to the master cylinder 24 via the pressure line 42.

HOLD MODE

In this control mode, a limited first value, e.g. 2A of electric current serving as the control signal is applied to the actuator 16 to position the anchor closer to the actuator 16 than in the previous case. As a result, the inlet port 16b and the drain port 16d are closed to block fluid communication between the pressure line 42 and the braking pressure line 46 and between the braking pressure line and the drain passage 78. Therefore, the fluid pressure in the braking pressure line 46 is held at the level extant at the moment the actuator is operated by the control signal.

In this case, the fluid pressure applied through the master cylinder flows through the pressure check valve 66 to the pressure accumulator 70.

RELEASING MODE p In this control mode, a maximum value, e.g. 5A of electric current serving as the control signal is applied to the actuator 16 to shift the anchor all the way toward the actuator 16. As a result, the drain port 16d is opened to establish fluid communication between the drain port 16d and the outlet port 16c. At this time, the fluid pump 90 serves to facilitate fluid flow from the braking pressure line 46 to the drain passage 78. The fluid flowing through the drain passage is partly accumulated in the fluid reservoir 76 and the remainder flows to the pressure accumulator 70 via the check valves 60 and 54 and the fluid pump 90.

It will be appreciated that, even in this release mode, the fluid pressure in the pressure line 42 remains at a level higher or equal to that in the braking pressure line 46, so that fluid flow from the braking pressure line 46 to the pressure line 42 via the bypass passage 98 and via the bypass check valve 85 will never occur.

The design of the wheel speed sensors 10, 12 and 14 employed in the preferred embodiment of the anti-skid control system will be described in detail with reference to FIGS. 7 to 9.

Figure 7:
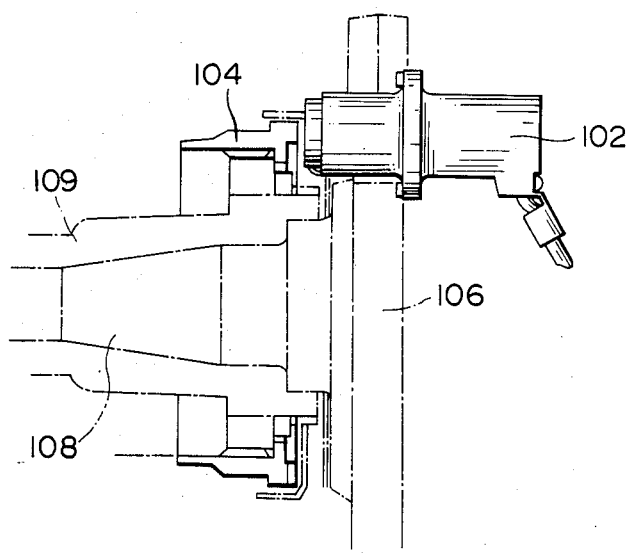
FIG. 7 is a perspective view of a wheel speed sensor adapted to detect the speed of a front wheel.

FIG. 7 shows the structure of the wheel speed sensor 10 for detecting the rate of rotation of the left front wheel. The wheel speed sensor 10 generally comprises a sensor rotor 104 adapted to rotate with the vehicle wheel, and a sensor assembly 102 fixedly secured to the shim portion 106 of the knuckle spindle 108. The sensor rotor 104 is fixedly secured to a wheel hub 109 for rotation with the vehicle wheel.

Figure 9:
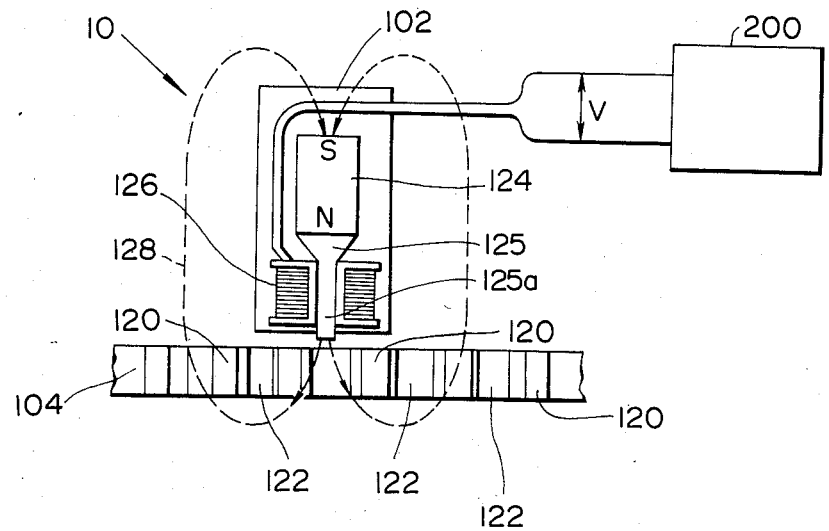
FIG. 9 is an explanatory illustration of the wheel speed sensors of FIGS. 7 and 8.
Figure 10:
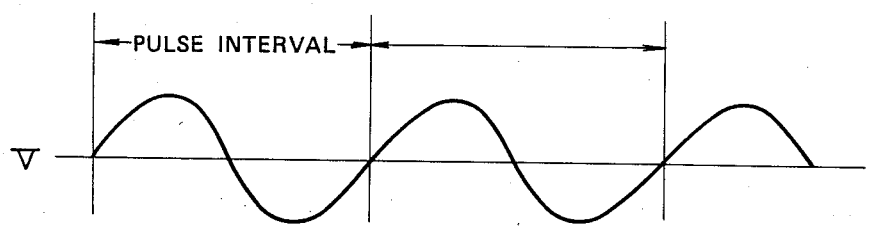
FIG. 10 shows the waveform of an alternating current sensor signal produced by the wheel speed sensor.

As shown in FIG. 9, the sensor rotor 104 is formed with a plurality of sensor teeth 120 at regular angular intervals. The width of the teeth 120 and the grooves 122 therebetween are equal in the shown embodiment and define to a unit angle of wheel rotation. The sensor assembly 102 comprises a magnetic core aligned with its north pole (N) near the sensor rotor 104 and its south pole (S) distal from the sensor rotor. A metal element 125 with a smaller diameter section 125a is attached to the end of the magnetic core 124 nearer the sensor rotor. The free end of the metal element 125 faces the sensor teeth 120. An electromagnetic coil 126 encircles the smaller diameter section 125a of the metal element. The electromagnetic coil 126 is adapted to detect variations in the magnetic field generated by the magnetic core 124 to produce an alternating-current sensor signal as shown in FIG. 10. That is, the metal element and the magnetic core 124 form a kind of proximity switch which adjusts the magnitude of the magnetic field depending upon the distance between the free end of the metal element 125 and the sensor rotor surface. Thus, the intensity of the magnetic field fluctuates in relation to the passage of the sensor teeth 120 and accordingly in relation to the angular velocity of the wheel.

It should be appreciated that the wheel speed sensor 12 for the right front wheel has the substantially the same structure as the set forth above. Therefore, also explanation of the structure of the right wheel speed sensor 12 will be omitted in order to avoid unnecessary repetition of disclosure and in order to simplify the description.

Figure 8:
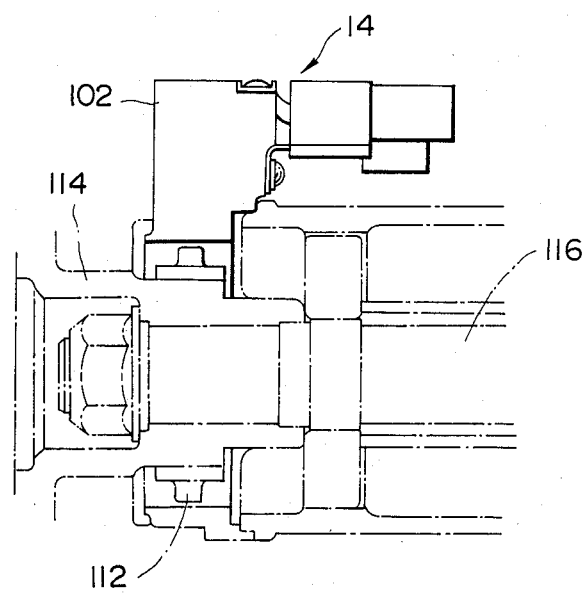
FIG. 8 is a side elevation of a wheel speed sensor adapted to detect the speed of a rear wheel.

FIG. 8 shows the structure of the rear wheel speed sensor 14. As with the aforementioned left front wheel speed sensor 10, the rear wheel speed sensor 14 comprises a sensor rotor 112 and a sensor assembly 102. The sensor rotor 112 is associated with a companion flange 114 which is, in turn, rigidly secured to a drive shaft 116 for rotation therewith. Thus, the sensor rotor 112 rotates with the drive shaft 116. The sensor assembly 102 is fixed to a final drive housing or a differential gear box (not shown).

Each of the sensor assemblies applied to the left and right front wheel speed sensors and the rear wheel sensor is adapted to output an alternating-current sensor signal having a frequency proportional to or corresponding to the rotational speed of the corresponding vehicle wheel. The electromagnetic coil 126 of each of the sensor assemblies 102 is connected to the control module 100 to supply the sensor signals thereto.

As set forth above, the control module 200 comprises the controller unit (FL) 202, the controller unit (FR) 204 and the controller unit (R) 206, each of which comprises a microcomputer. Therefore, the wheel speed sensors 10, 12 and 14 are connected to corresponding controller units 202, 204 and 206 and send their sensor signals thereto. Since the structure and operation of each of the controller units is substantially the same as that of the others, the structure and operation of only the controller unit 202 for performing the anti-skid brake control for the front left wheel cylinder will be explained in detail.

Figure 11:
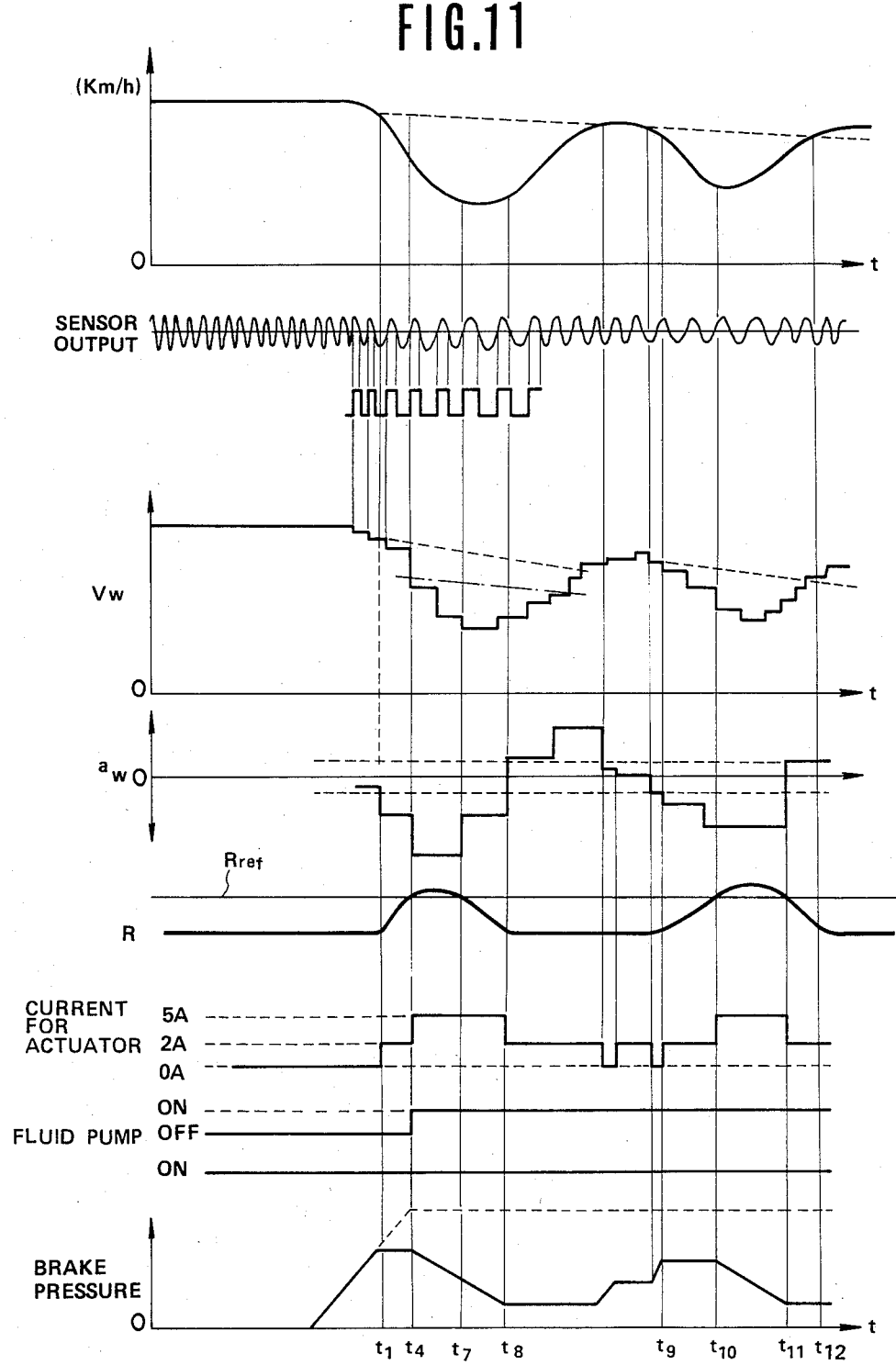
FIG. 11 is a timing chart for the anti-skid control system.

FIG. 11 is a timing chart of the anti-skid control performed by the controller unit 202. As set forth above, the alternating-current sensor signal output from the wheel speed sensor 10 is converted into a rectangular pulse train, i.e. as the sensor pulse signal mentioned above. The controller unit 202 monitors occurrences of sensor pulses and measures the intervals between individual pulses or between the first pulses of groups of relatively-high-frequency pulses. Pulses are so grouped that the measured intervals will exceed a predetermined value, which value will be hereafter referred to as "pulse interval threshold".

The wheel rotation speed $V_w$ is calculated in response to each sensor pulse. As is well known, the wheel speed is generally inversely proportional to the intervals between the sensor pulses, and accordingly, the wheel speed $V_w$ is derived from the interval between the last sensor pulse input time and the current sensor pulse input time. A target wheel speed $V_i$ is then derived from the resultant wheel speed $V_w$. In addition, the slip rate $a_w$ is derived from the rate of change of the wheel speed and an projected speed $V_v$ which is estimated from the wheel speed at the moment the brakes are applied based on the assumption of a continuous, linear deceleration without slippage. The acceleration or deceleration of the wheel is derived from the following equation:

$$a_w = \left(\frac{1}{C-B} - \frac{1}{B-A}\right) / \left(\frac{C-A}{2}\right)$$

where A, B and C are the input times of the sensor pulses in the order given.

The target wheel speed $V_i$ is derived from the wheel speed of the last skid cycle during which the wheel deceleration rate was equal to or less than a given value which will be hereafter referred to as "deceleration threshold $a_{ref}$", and the wheel speed of the current skid cycle, and by estimating the rate of change of the wheel speed between wheel speeds at which the rate of deceleration is equal to or less than the deceleration threshold. In addition, the slip rate R is derived by solving the following equation:

$$R = \frac{V_i - V_w}{V_i} \quad (2)$$

Finally, the controller unit 202 determines the control mode, i.e., release mode, hold mode and application mode from the slip rate R and the wheel acceleration or deceleration $a_w$.

For example, assuming that the controller unit 202 starts to operate at a time $t_1$ in response to application of the brake to decelerate the vehicle, the first sensor pulse input time ($t_1$) is held in the controller unit 202. Upon receipt of the subsequent sensor pulse at a time $t_2$, the wheel speed $V_w$ is calculated by deriving the current sensor pulse period ($dt = t_2 - t_1$). In response to the subsequently received sensor pulses at times $t_3, t_4 \ldots$, the vehicle speed values $V_{w2}, V_{w3} \ldots$ are calculated.

Based on the input timing $t_1, t_2, t_3, t_4 \ldots$, deceleration rate $a_w$ is derived from the foregoing equation (1). In addition, the projected speed $V_y$ is estimated as a function of the wheel speed $V_w$ and rate of change thereof. Based on the average deceleration determined on the basis of the instantaneous wheel speeds at which the wheel deceleration is equal to or less than the deceleration threshold $a_{ref}$ and the wheel speed $V_1$ at the time $t_1$, the target wheel speed $V_i$ is calculated. However, for the first cycle of skid control, the deceleration rate will be taken from a previously stored fixed value. According to equation (2), the slip rate R is calculated, using successive wheel speed values $V_{w1}, V_{w2}, V_{w3} \ldots$ as parameters. The derived slip rate R is compared with a predetermined value which will be hereafter referred to as "slip rate threshold $R_{ref}$". Assuming that the wheel speed $V_w$ drops below the projected speed $V_y$ at the time $t_2$, the controller unit 202 switches the control mode from the application mode to the hold mode. Assuming also that the slip rate R exceeds the slip rate threshold at the time $t_4$, then the controller unit 202 switches the control mode to the release mode to release the fluid pressure at the wheel cylinder.

Upon release of the brake pressure in the wheel cylinder, the wheel speed $V_w$ recovers, i.e. the slip rate R drops until it is smaller than the slip rate threshold at time $t_7$. The controller unit 202 detects when the slip rate R is smaller than the slip rate threshold $R_{ref}$ and switches the control mode from release mode to the hold mode.

By maintaining the brake system in the hold mode in which reduced brake pressure is applied to the wheel cylinder, the wheel speed increases until it reaches the projected speed as indicated by the intersection of the dashed line ($V_y$) and the solid trace in the graph of $V_w$ in FIG. 11. When the wheel speed $V_w$ becomes equal to the projected speed (at a time $t_{10}$), the controller unit 202 switches the control mode from the hold mode to the application mode.

As can be appreciated from the foregoing description, the control mode will tend to cycle through the control modes in the order application mode, hold mode, release mode and hold mode, as exemplified in the period of time from $t_1$ to $t_{10}$. This cycle of variation of the control modes will be referred to hereafter as "skid cycle". Practically speaking, there will of course be some hunting and other minor deviations from the standard skid cycle.

The projected speed $V_y$, which is meant to represent ideal vehicle speed behavior, at time $t_1$ can be obtained directly from the wheel speed $V_w$ at that time since zero slip can be assumed. At the same time, the deceleration rate of the vehicle will be assumed to be a predetermined fixed value or the appropriate one of a family thereof, in order to enable calculation of the projected speed $V_y$. Specifically, in the shown example, the projected speed $V_y$ at the time $t_1$ will be derived from the wheel speed $V_{w1}$ at that time. Using the predetermined deceleration rate, the projected speed will be calculated at each time $t_2, t_3, t_4$.

At time $t_{10}$, the wheel speed $V_w$ exceeds the projected speed $V_y$. At the time $t_{10}$, the controller unit 202 responds to this change in the wheel speed to switch the control mode to the application mode from the hold mode. After a while, the wheel speed $V_w$ again drops below the projected speed $V_y$ and at that time the controller unit 202 will again switch from the application mode to the hold mode.

Relating the above control operations to the structure of FIGS. 3 through 6, when the application mode is used, no electrical current is applied to the actuator of the electromagnetic valve 16a so that the inlet port 16b communicates with the outlet port 16c, allowing fluid flow between the pressure passage 42 and the brake pressure line 46. A limited amount of electrical current (e.g. 2A) is applied at times $t_2$ and $t_3$, so as to actuate the electromagnetic valve 16a to its limited stroke position by means of the actuator 16, and the maximum current is applied to the actuator as long as the wheel speed $V_w$ is not less than the projected speed and the slip rate is greater than the slip rate threshold $R_{ref}$. Therefore, in the shown example, the control mode is switched from the application mode to the hold mode at time $t_2$ and then to the release mode at time $t_4$. At time $t_7$, the slip rate increases back up to the slip rate threshold $R_{ref}$, so that the control mode returns to the hold mode, the actuator driving the electromagnetic valve 16a to its central holding position with the limited amount of electrical current as the control signal. When the wheel speed $V_w$ finally returns to the level of the projected speed at time $t_{10}$, the actuator 16 supply current is cut off so that the electromagnetic valve 16a returns to its rest position in order to establish fluid communication between the pressure line 42 and the braking pressure line 46 via inlet and outlet ports 16b and 16c.

Figure 12:
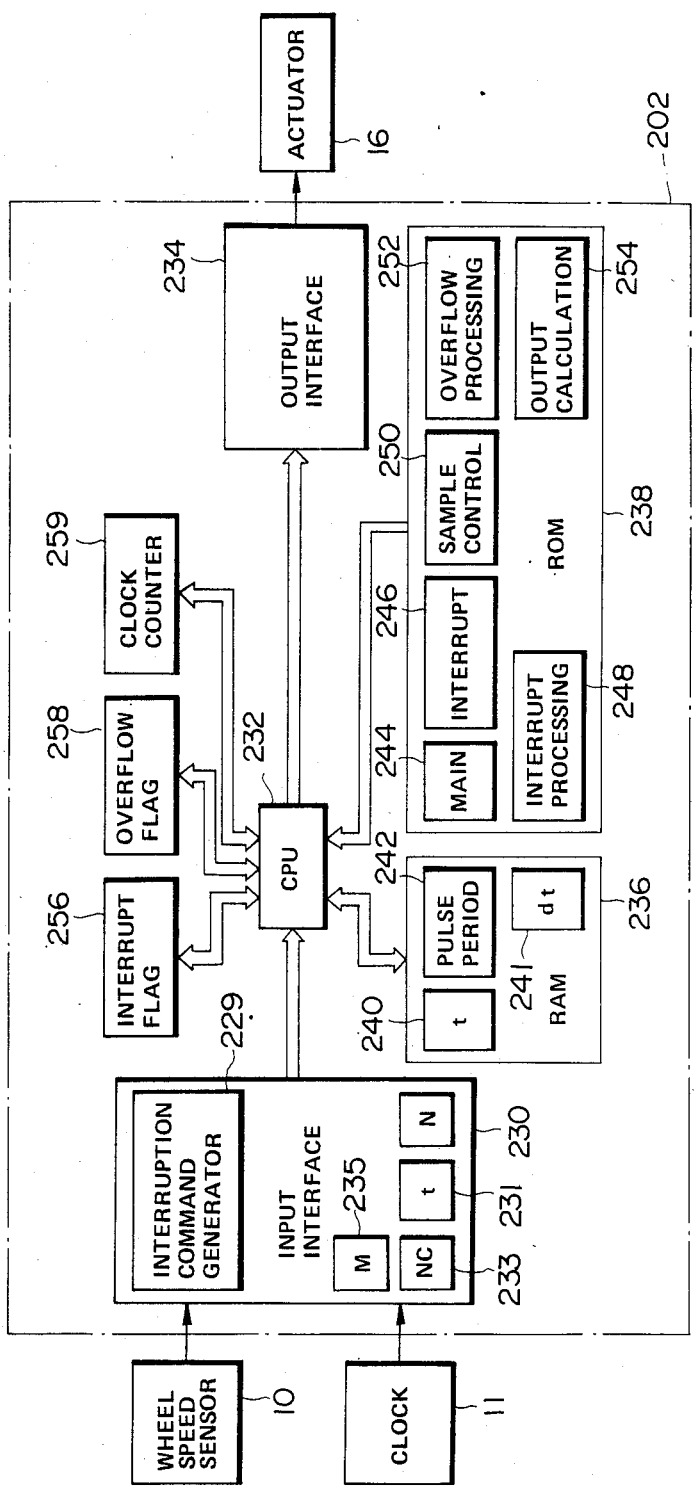
FIG. 12 is a block diagram of the preferred embodiment of a controller unit in the anti-skid brake control system according to the present invention.
Figure 15:
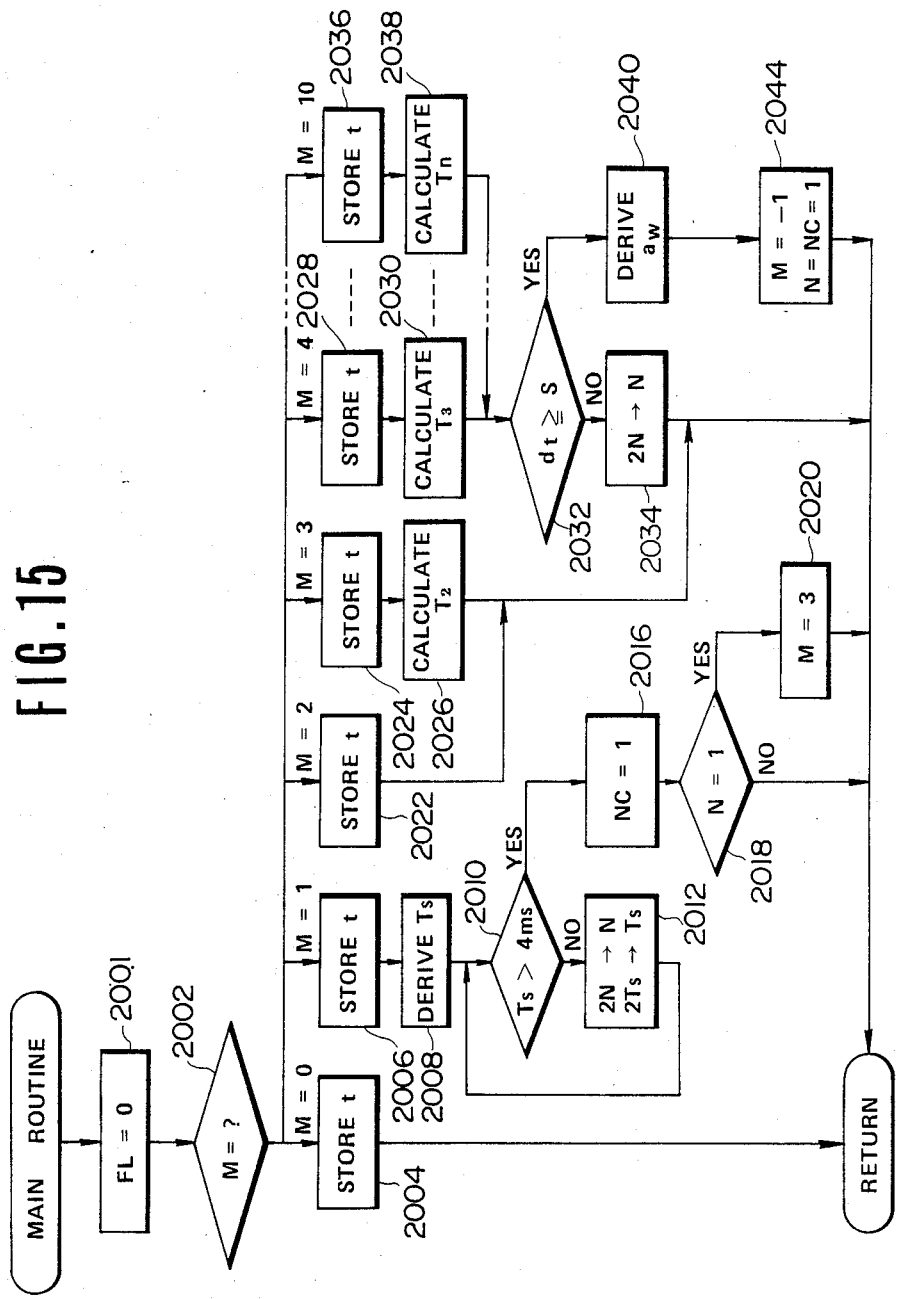
FIG. 15 is a flowchart of a main routine in the main program of FIG. 13.

Referring to FIG. 12, the controller unit 202 includes an input interface 230, CPU 232, an output interface 234, RAM 236 and ROM 238. The input interface 230 includes an interrupt command generator 229 which produces an interrupt command in response to every sensor pulse. In ROM, a plurality of programs including a main program (FIG. 13), an interrupt program (FIG. 15), an sample control program (FIG. 19), a timer overflow program (FIG. 20) and an output calculation program (FIG. 23) are stored in respectively corresponding address blocks 244, 246, 250, 252 and 254.

The input interface also has a temporary register for temporarily holding input timing for the sensor pulses. RAM 236 similarly has a memory block holding input timing for the sensor pulses. The contents of the memory block 240 of RAM may be shifted whenever calculations of the pulse interval, wheel speed, wheel acceleration or deceleration, target wheel speed, slip rate and so forth are completed. One method of shifting the contents is known from the corresponding disclosure of the U.S. Pat. No. 4,408,290 to the common inventor to the present invention and commonly assigned to the common assignee, issued on Oct. 4, 1983. The disclosure of the U.S. Pat. No. 4,408,290 is hereby incorporated by reference. RAM also has a memory block 242 for holding pulse intervals of the input sensor pulses. The memory block 242 is also adapted to shift the contents thereof according to the manner similar to set forth in the U.S. Pat. No. 4,408,290.

An interrupt flag 256 is provided in the controller unit 202 for signalling interrupt requests to the CPU. The interrupt flag 256 is set in response to the interrupt command from the interrupt command generator 229. A timer overflow interrupt flag 258 is adapted to set an overflow flag when the measured interval between any pair of monitored sensor pulses exceeds the a capacity of a clock counter.

In order to time the arrival of the sensor pulses, a clock is connected to the controller unit 202 to feed time signals indicative of elapsed real time. The timer signal value is latched whenever a sensor pulse is received and stored in either or both of the temporary register 231 in the input interface 230 and the memory block 240 of RAM 236.

The operation of the controller unit 202 and the function of each elements mentioned above will be described with reference to FIGS. 13 to 21.

Figure 13:
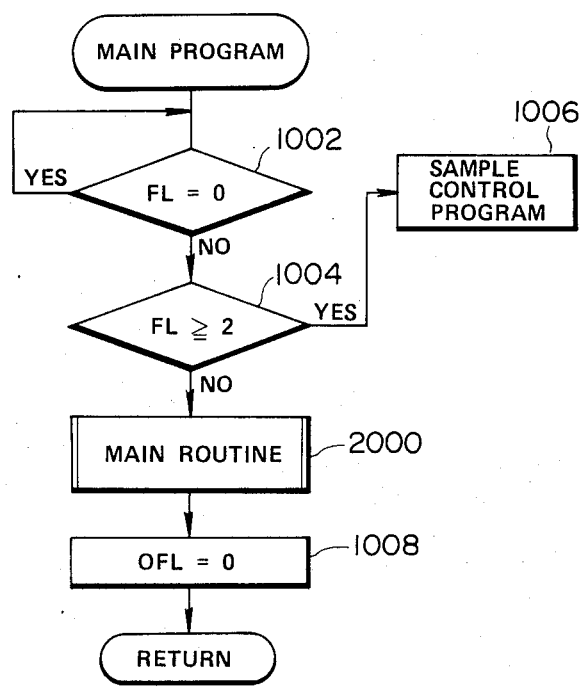
FIG. 13 is a flowchart of a main program of a microcomputer constituting the controller unit of FIG. 12.

FIG. 13 illustrates the main program for the anti-skid control system. Practically speaking, this program will generally be executed as a background job, i.e. it will have a lower priority than most other programs under the control of the same processor. Its first step 1002 is to wait until at least one sample period, covering a single sensor pulse or a group thereof, as described in more detail below, is completed as indicated when a sample flag FL has a non-zero value. In subsequent step 1004, the sample flag FL is checked for a value greater than two, which would indicate the sample period is too short. If this is the case, control passes to a sample control program labelled "1006" in FIG. 13 but shown in more detail in FIG. 20. If FL=1, then the control process is according to plan, and control passes to a main routine explained later with reference to FIG. 15. Finally, after completion of the main routine, a time overflow flag OFL is reset to signify successful completion of another sample processing cycle, and the main program ends.

Figure 14:
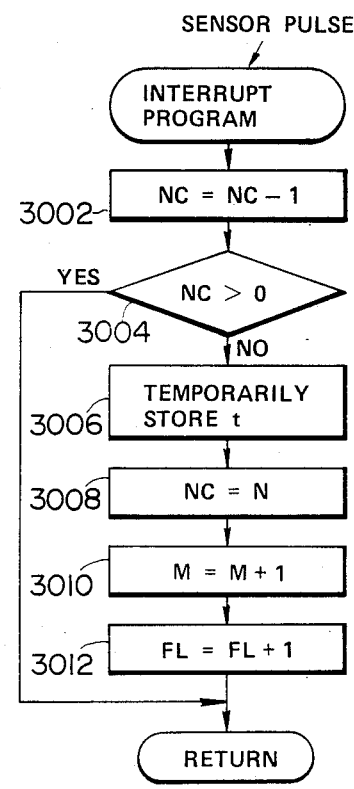
FIG. 14 is a flowchart of an interrupt program executed by the controller unit.

FIG. 14 shows the interrupt program stored in the memory block 246 of ROM 238 and executed in response to the interrupt command generated by the interrupt command generator 229 whenever a sensor pulse is received. It should be noted that a counter value NC of an auxiliary counter 233 is initially set to 1, a register N representing the frequency divider ratio is set at 1, and a counter value M of an auxiliary counter 235 is set at −1. After starting execution of the interrupt program, the counter value NC of the auxiliary counter 233 is decremented by 1 at a block 3002. The auxiliary counter value NC is then checked at a block 3004 for a value greater than zero. For the first sensor pulse, since the counter value NC is decremented by 1 (1−1=0) at the block 3002 and thus is zero, the answer of the block 3004 is NO. In this case, the clock counter value t is latched in a temporary register 231 in the input interface 230 at a block 3006. The counter value NC of the auxiliary counter 233 is thereafter assigned the value N in a register 235, which register value N is representative of frequency dividing ratio determined during execution of the main routine explained later, at a block 3008. The value M of an auxiliary counter 235 is then incremented by 1. The counter value M of the auxiliary counter 235 labels each of a sequence of sample periods covering an increasing number of sensor pulses. After this, the sample flag FL is incremented by 1 at a block 3012. After the block 3012, the interrupt program ends, returning control to the main program or back to block 3002, whichever comes first.

On the other hand, when the counter value NC is non-zero when checked at the block 3004, this indicates that not all of the pulses for this sample period have been received, and so the interrupt program ends immediately.

This interrupt routine thus serves to monitor the input timing t of each pulse sampling period, i.e. the time t required to receive NC pulses, and signals completion of each sample period (M=0 through M=10, for example) for the information of the main program.

Figure 16:
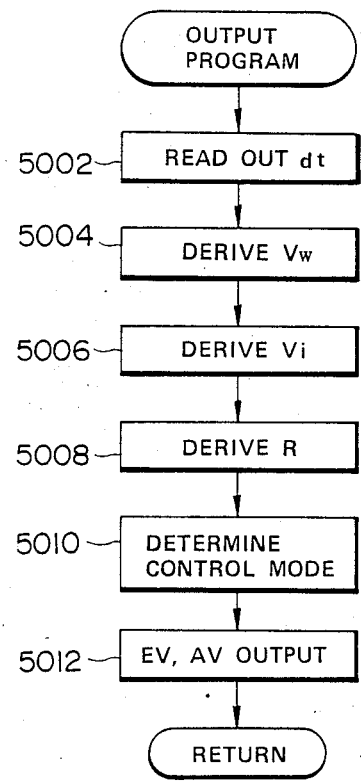
FIG. 16 is a flowchart of an output calculation program for deriving EV and V signals for controlling the operational mode of the electromagnetic valve according to the valve conditions of FIGS. 4, 5 and 6.
Figure 17:
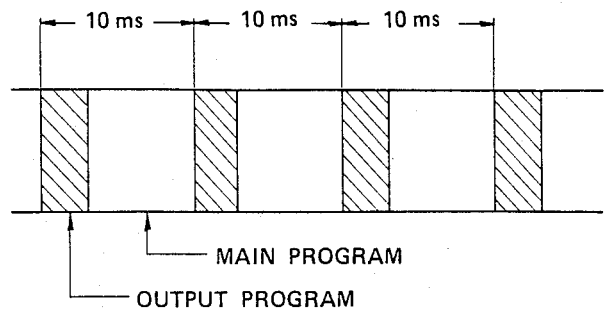
FIGS. 17 and 18 are diagrams of execution timing of the output calculation program in relation to the main program.
Figure 18:
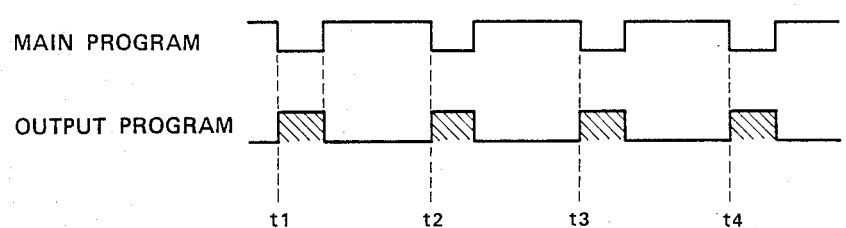

FIG. 16 shows the output program for deriving the wheel speed $V_w$, wheel acceleration and deceleration $a_w$ and slip rate R, selecting the operational mode, i.e. application mode, hold mode and release mode and outputting an inlet signal EV and/or an outlet signal AV depending upon the selected operation mode of the actuator 16.

When the application mode is selected the inlet signal AV goes HIGH and the outlet signal EV goes HIGH. When the release mode is selected, the inlet signal EV goes LOW and the outlet signal AV also goes LOW. When the selected mode is hold mode, the inlet signal EV remains HIGH while the outlet signal AV goes LOW. These combinations of the inlet signal EV and the outlet signal AV correspond to the actuator supply current levels shown in FIG. 11 and thus actuate the electromagnetic valve to the corresponding positions illustrated in FIGS. 4, 5 and 6.

The output program is stored in the memory block 254 and adapted to be read out periodically, e.g. every 10 ms, to be executed as an interrupt program. The output calculation program is executed in the time regions shown in hatching in FIGS. 17 and 18.

During execution of the output calculation program, the pulse interval T is read out from a memory block 241 of RAM which stores the pulse interval, at a block 5002. As set forth above, since the pulse interval T is inversely proportional to the wheel rotation speed $V_w$, the wheel speed can be derived by calculating the reciprocal (1/T) of the pulse interval T. This calculation of the wheel speed $V_w$ is performed at a block 5004 in the output program. After the block 5004, the target wheel speed $V_i$ is calculated at a block 5006. The manner of deriving the target wheel speed $V_i$ has been illustrated in the U.S. Pat. Nos. 4,392,202 to Toshiro MATSUDA, issued on July 5, 1983, 4,384,330 also to Toshiro MATSUDA, issued May 17, 1983 and 4,430,714 also to Toshiro MATSUDA, issued on Feb. 7, 1984, which are all assigned to the assignee of the present invention. The disclosure of the above-identified three U.S. Patents are hereby incorporated by reference. As is obvious herefrom, the target wheel speed $V_i$ is derived as a function of wheel speed deceleration as actually detected. For instance, the wheel speed $V_w$ at (a) of FIG. 30 at which the wheel deceleration $a_w$ exceeds a predetermined value −b is taken as one reference point for deriving the target wheel speed $V_i$. The wheel speed at (b) of the current skid cycle, at which the wheel deceleration $a_w$ also exceeds the predetermined value −b, is taken as the other reference point. In addition, the period of time between the points a and b is measured. Based on the wheel speed $V_{w1}$ and $V_{w2}$ and the measured period P, the deceleration rate $dV_i$ is derived from:

$$dV_i = (V_{w1} - V_{w2})/P$$

This target wheel speed $V_i$ is used for skid control in the next skid cycle.

It should be appreciated that in the first skid cycle, the target wheel speed $V_i$ cannot be obtained. Therefore, for the first skid cycle, a predetermined fixed value will be used as the target wheel speed $V_i$.

Figure 19:
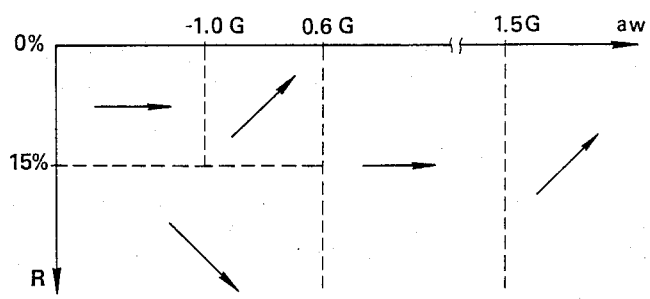
FIG. 19 is a table determining the operation mode of the actuator 16, which table is accessed in terms of the wheel acceleration and deceleration and the slip rate.

At a block 5008, the slip rate R is calculated according to the foregoing formula (2). Subsequently, the operational mode is determined on the basis of the wheel acceleration and deceleration $a_w$ and the slip rate R, at a block 5010. FIG. 19 shows a table used in determining or selecting the operational mode of the actuator 16 and which is accessed according to the wheel acceleration and deceleration $a_w$ and the slip rate R. As can be seen, when the wheel slip rate R is in the range of 0 to 15%, the hold mode is selected when the wheel acceleration and deceleration $a_w$ is lower than −1.0 G and the application mode is selected when the wheel acceleration and deceleration $a_w$ is in the range of −1.0 G to 0.6 G. On the other hand, when the slip rate R remains above 15%, the release mode is selected when the wheel acceleration and deceleration $a_w$ is equal to or less than 0.6 G, and the hold mode is selected when the wheel acceleration and deceleration is in a range of 0.6 G to 1.5 G. When the wheel acceleration and deceleration $a_w$ is equal to or greater than 1.5 G, the application mode is selected regardless of the slip rate.

According to the operational mode selected at the block 5010, the signal levels of the inlet signal EV and the outlet signal AV are determined so that the combination of the signal levels corresponds to the selected operation mode of the actuator 16. The determined combination of the inlet signal EV and the outlet signal AV are output to the actuator 16 to control the electromagnetic valve.

Figure 20:
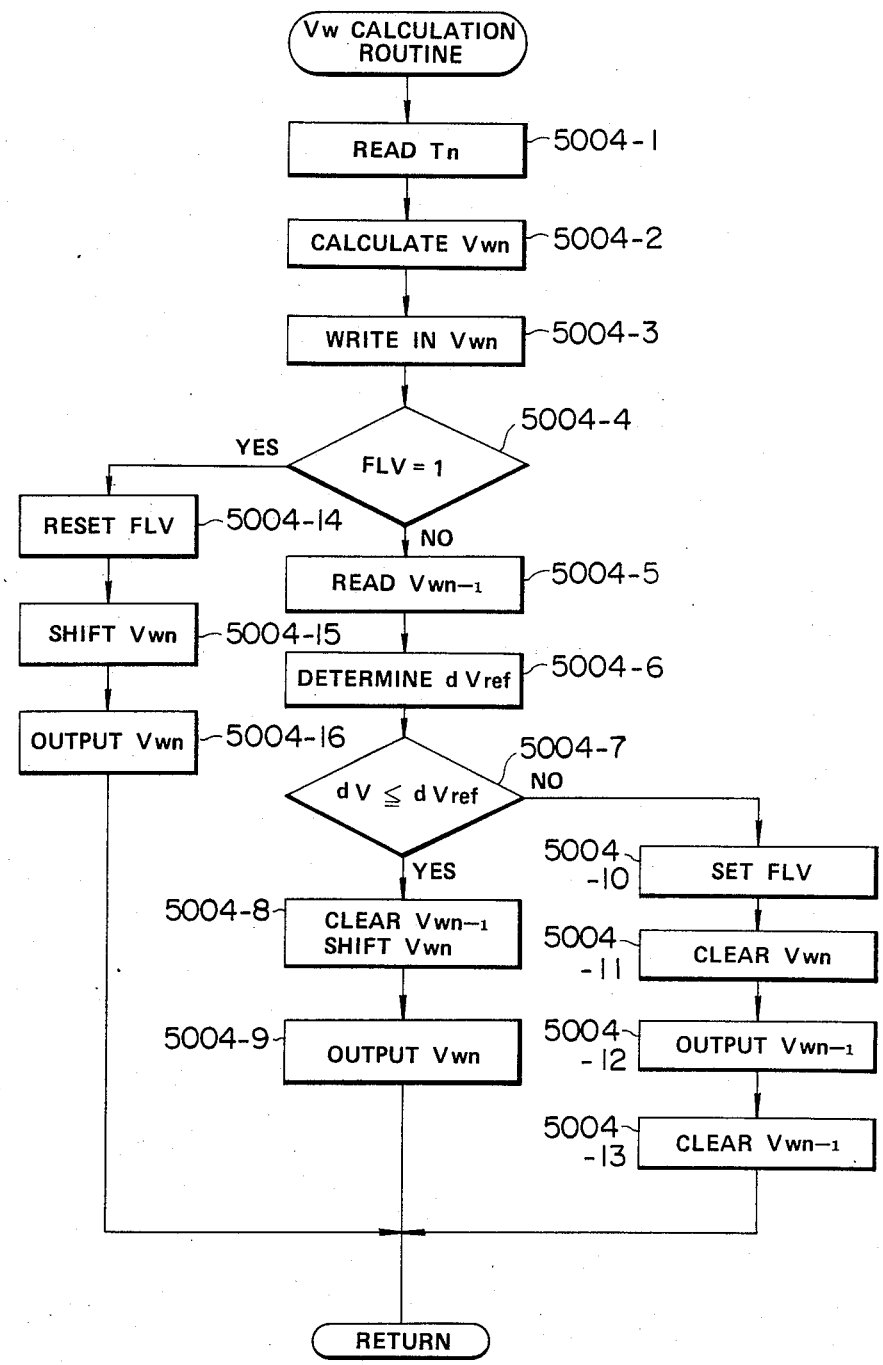
FIG. 20 is a flowchart of the wheel speed deriving routine in the output calculation program of FIG. 16.

Referring to FIG. 20, a wheel speed deriving routine is illustrated. As will be appreciated, this wheel speed deriving routine is executed at the block 5004 of the output calculation program of FIG. 16.

After starting the wheel speed deriving routine, the sensor pulse interval $T_n$ stored in the memory block 242 of RAM 236 is read out at a block 5004-1. Based on the read out sensor pulse interval $T_n$, the wheel speed $V_{wn}$ corresponding to the read out sensor pulse interval $T_n$ is calculated from $V_{wn} = k_1/T_n$ ($k_1$: constant determined depending upon ratio of the diameter of the wheel sensor rotor and the diameter of the wheel), at a block 5004-2.

Here, the wheel speed $V_{wn}$ derived at the instant cycle of program execution will be referred to as "instant wheel speed" and the wheel speed $V_{wn-1}$ derived in the proceeding cycle of program execution is referred to as "old wheel speed". Further, it should be noted that the instant and old wheel speeds $V_{wn}$ and $V_{wn-1}$ are stored in a shiftable memory block 243 of RAM 236. The memory block 243 has first and second sections 243-1 and 243-2 respectively adapted to store the instant and old wheel speeds.

Now returning to FIG. 20, after performing calculation at the block 5004-2, the derived instant wheel speed $V_{wn}$ is written in the first section 243-1 of the memory block 243, at a block 5004-3. At a block 5004-4, a wheel speed flag FLV to be set in a wheel speed flag register 257 is checked. If the flag FLV is not set, the old wheel speed $V_{wn-1}$ is read out at a block 5004-5. A memory table 255 is ROM of the control unit is then looked up in terms of the read old wheel speed $V_{wn-1}$ at a block 5004-6 to determine a given threshold $dV_{ref}$.

Figure 21:
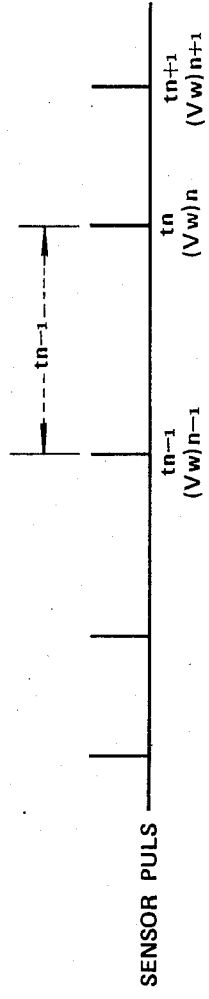
FIG. 21 is a chart showing the relationships between the sensor signal input times and the corresponding wheel speed values.

Here, the given threshold $dV_{ref}$ is variable according to a predetermined pattern as illustrated in FIG. 21. In general, the wheel speed variation can be illustrated by the following equations:

$$A = V_{wn-1} \times t + \tfrac{1}{2} \times a \times t^2 \qquad (5)$$

$$V_{wn} = V_{wn-1} + a \times t \qquad (6)$$

where

A is a constant determined depending upon specific wheel speed sensor, which constant is proportional to peripheral movement magnitude of the wheel within a period of time t; and a is a wheel acceleration or deceleration during the period of time from $t_{n-1}$ to $t_n$.

From the foregoing equations (5) and (6), the following formula can be established:

$$\begin{aligned} 2Aa &= V_{wn}^2 - V_{wn-1}^2 \qquad (7) \\ &= (V_{wn} - V_{wn-1})(V_{wn} + V_{wn-1}) \\ &= dV \times (V_{wn} + V_{wn-1}) \end{aligned}$$

Assuming the period of time from $t_{n-1}$ to $t_n$ is substantially short and thus the wheel speed $V_{wn}$ is not significantly varied from the wheel speed $V_{wn-1}$ or is rather regarded as approximately the same value, the formular (7) can be modified as follow:

$$2Aa = dV \times V_{wn-1} \qquad (8)$$

As will be appreciated herefrom, the difference dV of the instant wheel speed and the old wheel speed become inversely proportional to the old wheel speed. Assuming the possible maximum wheel acceleration or deceleration is $a_{max}$, the given threshold $dV_{ref}$ can be derived from the following equation:

$$dV_{ref} = (A \times a_{max})/V_{wn-1} \qquad (9)$$

Therefore, as shown in FIG. 21, the given threshold $dV_{ref}$ is derived in terms of the old wheel speed $V_{wn-1}$. In practice, the given threshold values are stored in ROM in a form of a look-up table to be looked up in terms of the old wheel speed.

Then, the instant wheel speed $V_{wn}$ and the old wheel speed $V_{wn-1}$ are compared at a block 5004-7. In practice, a difference of the instant and old wheel speeds dV ($=V_{wn} - V_{wn-1}$) is compared with a given threshold $dV_{ref}$ at the block 5004-7. If the difference dV is equal to or smaller than the given threshold $dv_{ref}$, then the old wheel speed $V_{wn-1}$ stored in the second section 243-2 of the memory block 243 is cleared at a block 5004-8. At the same block 5004-8, the instant wheel speed $V_{wn}$ is shifted from the first section 243-1 to the second section 243-2. Thereafter, the content of the second section 243-2 of the memory block 243 is output at a block 5004-9.

On the other hand, when the difference dV is greater than the given threshold $dV_{ref}$, as checked at the block 5004-6, then the wheel speed flag FLV is set in the wheel speed flag register 257, at a block 5004-10. The instant wheel speed $V_{wn}$ as stored in the first section 243-1 is then cleared at a block 5004-11. The old wheel speed $V_{wn-1}$ as stored at the second section 243-2 is output as the instant wheel speed at a block 5004-12. Thereafter, the old wheel speed $V_{wn-1}$ stored in the second section 243-1 of the memory block 243 is cleared at a block 5004-13.

When the setting condition of the wheel speed flag FLV is detected as checked at the block 5004-14, then, the wheel speed flag register 257 is reset at a block 5004-14. The instant wheel speed $V_{wn}$ written in the first section 243-1 is shifted to the second section 243-2 at a block 5004-15. Thereafter, the instant wheel speed $V_{wn}$ as stored in the second section 243-2 is output as the instant wheel speed data at a block 5004-16.

After outputting wheel speed data at the blocks 5004-9, 5004-13 or 5004-16, process returns to the output calculation program.

Here, the procedure performed by execution of the wheel speed deriving routine set forth above will be explained with reference to FIG. 21. Assuming the sensor pulse signals are sampled the input time data respectively indicative of the times $t_{n-1}$, $t_n$ and $t_{n+1}$, the sensor pulse intervals $T_{n1}$ and $T_{n2}$ are respectively $(t_n - t_{n-1})$ and $(t_{n+1} - t_n)$. From these sensor pulse intervals, the wheel speed $V_{w1}$ and $V_{w2}$ are derived at each time $t_n$ and $t_{n+1}$. As shown by the broken line in FIG. 21, if the derived wheel speed $V_{w2}$ has a value significantly different from the value of the wheel speed $V_{w1}$, then the wheel speed $V_{w2}$ derived relative to the input data $t_n$ is ignored and canceled.

As will be appreciated from FIG. 20, the section 243-1 is cleared at the block 5004-11, upon deriving the next wheel speed $V_{w3}$ with respect to the sensor pulse interval based on the input time data $t_{n+1}$ and $t_{n+2}$, the memory block 243 is empty, as the old wheel speed is cleared at the block 5004-13, the newly derived wheel speed $V_{w3}$ is output as instant wheel speed data.

Since it is not possible to vary the wheel speed significantly within a substantially short period of time, e.g. 10 ms., even when the substantial difference of the old and instant wheel speeds is detected and the instant wheel speed is ignored, it will not seriously affect performance of the anti-skid control. In this circumstance, it may be possible to use the old wheel speed data for the instant cycle of anti-skid control operation, when the instant wheel speed is substantially different from the old wheel speed data beyond the given threshold $dV_{ref}$.

Figure 22:
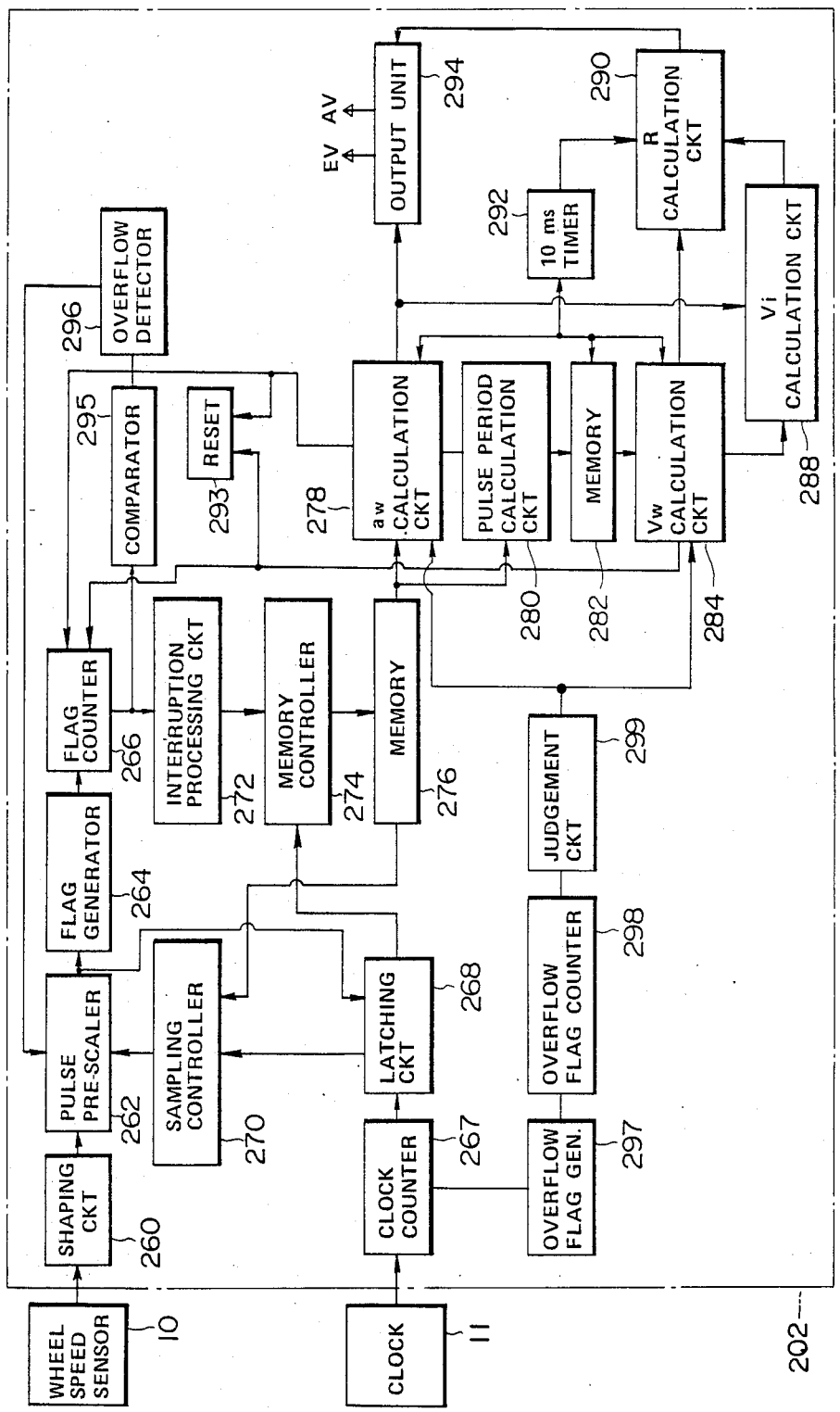
FIG. 22 is a block diagram of another embodiment of the controller unit in the preferred embodiment of the anti-skid brake control system according to the present invention.

FIG. 22 shows another embodiment of the controller unit 202 in the preferred embodiment of the anti-skid control system according to the present invention. In practice, the circuit shown in FIG. 22 performs the same procedure in controlling the actuator 16 and each block of the circuit performs an operation substantially corresponding to that performed by the foregoing computer flowchart.

In FIG. 22, the wheel speed sensor 10 is connected to a shaping circuit 260 provided in the controller unit 202. The shaping circuit 260 produces the rectangular sensor pulses having a pulse interval inversely proportional to the wheel speed $V_w$. The sensor pulse output from the shaping circuit 260 is fed to a pulse pre-scaler 262 which counts the sensor pulses to produce a sample command for sampling input timing when the counter value reaches a predetermined value. The predetermined value to be compared with the counter value in the pulse pre-scaler 262 is determined such that the intervals between the pairs of three successive sample commands will be sufficiently different to allow calculation of the wheel acceleration and deceleration rate.

The sample command is fed to a flag generator 264. The flag generator 264 is responsive to the sample command to produce a flag signal. The flag signal of the flag generator 264 is fed to a flag counter 266 which is adapted to count the flag signals and output a counter signal having a value representative of its counter value.

At the same time, the sample command of the pulse pre-scaler 262 is fed to a latching circuit 268 which is adapted to latch the signal value of a clock counter signal from a clock counter 267 counting the clock pulse output by a clock generator 11. The latched value of the clock counter signal is representative of the input timing of the sensor pulse which activates the pulse pre-scaler 262 to produce the sample command. The latching circuit 268 sends the input timing indicative signal having a value corresponding to the latched clock counter signal value, to a memory controller 274. The memory controller 274 is responsive to a memory command input from an interrupt processing circuit 272 which in turn is responsive to the flag counter signal to issue a memory command which activates the memory controller 274 to transfer the input timing indicative signal from the latching circuit 268 to a memory area 276. The memory 276 sends the stored input timing indicative signal to a sample controller 270 whenever the input timing signal value corresponding to the latched value of the latching circuit 268 is written therein. The sample controller 270 performs operations substantially corresponding to that performed in the blocks 2008, 2010, 2012, 2032 and 2034 in FIG. 15, i.e. it determines number of sensor pulses in each group to be ignored. The sample controller 270 outputs a pulse number indicative signal to the pulse pre-scaler 262, which pulse number indicative signal has a value approximating the predetermined value to be compared with the counter value in the pulse pre-scaler 262.

The memory 276 also feeds the stored input timing indicative signal to a wheel acceleration and deceleration calculation circuit 278 and a pulse interval calculation circuit 280. The wheel acceleration and deceleration calculation circuit 278 first calculates a pulse interval difference between pairs of three successively sampled sensor pulses. The obtained pulse interval difference is compared with a reference value so as to distinguish if the pulse interval difference is great enough to allow calculation of the wheel acceleration and deceleration $a_w$. If the obtained pulse interval difference is greater than the reference value, then the wheel acceleration and deceleration calculation circuit 278 performs calculation of the wheel acceleration and deceleration according to the foregoing formula (1). If the obtained pulse interval difference is smaller than the reference value, the wheel acceleration and deceleration calculation circuit 278 shifts the operational mode thereof in a manner substantially corresponding to the procedure disclosed with reference to FIG. 20, so as to achieve a pulse interval difference large enough to permit the wheel acceleration and deceleration calculation. On the other hand, the pulse interval calculation circuit 280 performs calculations to obtain the pulse interval between the current pulse and the immediate preceding pulse and sends a pulse interval indicative signal to a memory 282. The memory 282 sends a stored pulse interval indicative signal to a wheel speed calculation circuit 284 which is associated with a 10 ms timer 292. The 10 ms timer 292 produces a timer signal every 10 ms to activate the wheel speed calculation circuit 284. The wheel speed calculation circuit 284 is responsive to the timer signal to perform calculation of the wheel speed $V_w$ by calculating the reciprocal value of the pulse interval indicative signal from the memory 282. The wheel speed calculation circuit 284 thus produces a wheel speed indicative signal to be fed to a target wheel speed calculation circuit 288 and to a slip rate calculation circuit 290 which is also associated with the 10 ms timer to be activated by the timer signal every 10 ms.

The target wheel speed calculation circuit 288 is adapted to detect the wheel speed $V_w$ at which the wheel acceleration and deceleration $a_w$ calculated by the wheel acceleration and deceleration calculating circuit 278 exceeds than a predetermined deceleration rate $-b$. The target wheel speed calculation circuit 288 measures the interval between times at which the wheel deceleration exceeds the predetermined deceleration value. Based on the wheel speed at the foregoing times and the measured period of time, the target wheel speed calculation circuit 288 derives a decelerating ratio of the wheel speed to produce a target wheel speed indicative signal. The target wheel indicative signal of the target wheel speed calculation circuit 288 and the wheel speed indicative signal from the wheel speed calculation circuit 284 are fed to a slip rate calculation circuit 290.

The slip rate calculation circuit 290 is also responsive to the timer signal from the 10 ms timer 292 to perform calculation of the slip rate R based on the wheel speed indicative signal from the wheel speed calculation circuit 284 and the target wheel speed calculation circuit 288, in accordance with the formula (2).

The slip rate calculation circuit 290 and the wheel acceleration and deceleration calculation circuit 278 are connected to an output unit 294 to feed the acceleration and deceleration indicative signal and the slip rate control signal thereto. The output unit 294 determines the operation mode of the actuator 16 based on the wheel acceleration and deceleration indicative signal value and the slip rate indicative signal value. The output unit 294 thus produces the inlet and outlet signals EV and AV with a combination of signal levels corresponding to the selected operation mode of the actuator.

On the other hand, the wheel speed calculation circuit 284 is also connected to the flag counter 266 to feed a decrementing signal whenever the calculation of the wheel speed is completed and so decrement the counter value of the flag counter by 1. The flag counter 266 is also connected to a comparator 295 which is adapted to compare the counter value of the flag counter with a reference value, e.g. 2. When the counter value of the flag counter 266 is greater than or equal to the reference value, the comparator 295 outputs a comparator signal to an overflow detector 296. The overflow detector 296 is responsive to the comparator signal to feed a sample mode shifting command to be fed to the pulse pre-scaler 262 to shift the sample mode to increase the number of the sensor pulses in each sample group.

On the other hand, the clock counter 267 is connected to an overflow flag generator 297 which detects when the counter value reaches the full count of the clock counter to produce an overflow flag signal. The overflow flag signal of the overflow flag generator 297 is fed to an overflow flag counter 298 which is adapted to count the overflow flag signals and send an overflow counter value indicative signal to a judgment circuit 299. The judgment circuit 299 compares the overflow counter indicative signal value with a reference value e.g. 2. The judgment circuit 299 produces a reset signal when the overflow counter indicative signal value is equal to or greater than the reference value. The reset signal resets the wheel acceleration and deceleration calculation circuit 278 and the wheel speed calculation circuit 284 to zero. On the other hand, the overflow flag counter is connected to the wheel speed calculation circuit 284 and is responsive to the decrementing signal output from the wheel speed calculation circuit as set forth above to be reset in response to the decrementing signal.

Figure 23:
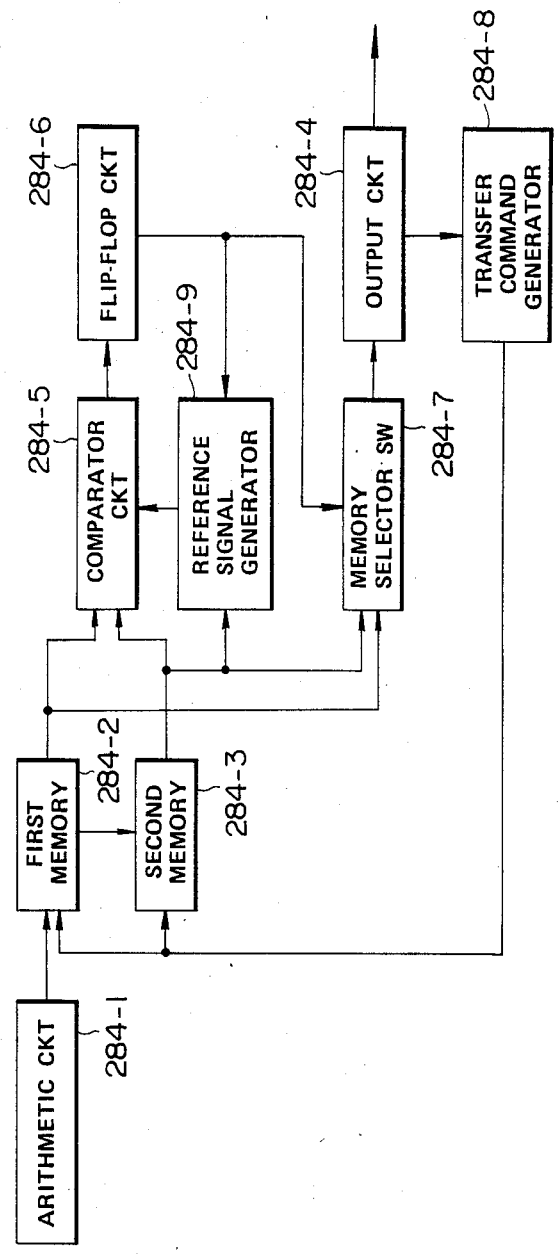
FIG. 23 is a circuit diagram of the wheel speed calculation circuit of the anti-skid control system of FIG. 22.

FIG. 23 shows the detailed circuit construction of the wheel speed $V_w$ calculation circuit 284 of FIG. 22. The wheel speed calculation circuit 284 generally comprises an arithmetic circuit 284-1 connected to the memory 276 to receive therefrom the input time data of the sampled sensor pulses. The arithmetic circuit 284-1 is operative to calculate the signal-to-signal interval $T_{n1}$, $T_{n2}$... and further calculates the wheel speed $V_{w1}$, $V_{w2}$ respectively corresponding to the signal-to-signal intervals $T_{n1}$, $T_{n2}$.... The arithmetic circuit 284-1 feeds a signal indicative of the derived wheel speed $V_{wn}$ to a first memory 284-2 to store the derive wheel speed as instant wheel speed $V_{wn}$. The first memory 284-2 is associated with a second memory 284-3 for storing the old wheel speed $V_{wn-1}$. The first memory transfers the stored value to the second memory in response to a transfer command fed from a transfer command generator 284-8 which is, in turn, connected to an output circuit 284-4 and responsive to output signal of the latter to produce the transfer command.

The first and second memories 284-2 and 284-3 are connected to a comparator circuit 284-5 which calculates difference of the instant and old wheel speeds $(V_{wn}-V_{wn-1})$ and compares the difference dV with the given threshold $dV_{ref}$. The comparator circuit 284-5 is also connected to a reference signal generator 284-8 which is, in turn, connected to the second memory 284-3. The reference signal generator 284-8 stores the given thresholds in a form of table to be read out in terms of the content of the second memory 284-3. The reference signal generator 284-8 is adapted to procude a reference signal having a value indicative of the given threshold $dV_{ref}$ and feed the reference signal to the comparator circuit 284-5.

The comparator circuit 284-5 produces an abnormal state indicative signal when the difference dV is greater than the given threshold $dV_{ref}$. The abnormal state indicative signal is fed to a flip-flop circuit 284-6. The flip-flop circuit 284-6 is normally maintained at reset condition and responsive to the abnormal state indicative signal input at its reset condition to be set. The flip-flop circuit 284-6 feeds a set signal to a memory selector switch 284-7. The memory selector switch 284-7 is normally positioned to feed the instant wheel speed $V_{wn}$ in the first memory 284-2 to the output circuit 284-4. The memory selector switch 284-7 is responsive to the set signal from the flip-flop circuit 284-6 to shift the switch position to feed the old wheel speed $V_{wn-1}$ to the output circuit 284-4.

At the same time, the set signal of the flip-flop circuit 284-6 is also fed to the reference signal generator 284-8 to deactivate or disable the latter so as not to produce the reference signal.

When subsequent wheel speed calculation is performed by the arithmetic circuit 284-1, new wheel speed $V_{wn+1}$ is derived. The new wheel speed $V_{wn+1}$ is then stored in the first memory 284-1 as new instant wheel speed. At this time, the second memory 284-3 stores the old wheel speed $V_{wn}$ which is judged as containing error value. Therefore, when the new instant wheel speed $V_{wn+1}$ indicates correct value, the comparator circuit 284-5 will again output the abnormal state indicative signal to be fed to the flip-flop circuit 284-6. The flip-flop circuit 284-6 at the set position, is responsive to the abnormal state indicative signal to be reset. As the set signal of the flip-flop circuit 284-6 is thus terminates, the memory selector switch 284-7 returns to its normal position to feed the instant wheel speed in the first memory 284-2 to the output circuit.

At the same time, the reference signal generator 284-8 is responsive to termination of the set signal of the flip-flop circuit 284-6 to become active to feed the reference signal indicative of the given threshold. Here, the reference signal produced by the reference signal generator 284-8 immediately after terminating of the set signal of the flip-flop circuit 284-6 may have a fixed value preset irrespective of the old wheel speed or a value derived at the immediately preceding operation for deriving the reference signal value. In the subsequent operation for deriving the reference signal value, one of the values stored therein in accessed in terms of the old wheel speed stored in the second memory 284-3. With this procedure, error in deriving the reference signal value, i.e. the given threshold can be avoided.

The output circuit 284-4 may include a temporary memory for latching the output signal value. The output circuit 284-4 may be detective of the position of the memory selector switch 284-7 as positioned at the foregoing shifted position and further detective of absence of the abnormal state indicative signal to output the stored value in the temporary memory therein as the wheel speed data output.

It should be noted that the given thresholds $dV_{ref}$ stored in the reference signal generator 284-8 may be obtained experimentarily.

As set forth above, according to the present invention, error in calculation of wheel speeds are satisfactorily and successfully avoided. This provides accuracy of anti-skid control. Therefore, the invention fulfills all of the objects and advantages sought thereto.

What is claimed is:
1. An anti-skid brake control system for an automotive hydraulic brake system comprising:
   a hydraulic brake circuit including a wheel cylinder for applying braking force to a vehicle wheel;
   a pressure control valve disposed within said hydraulic circuit and operative to increase fluid pressure in said wheel cylinder in a first position thereof, to decrease the fluid pressure in said wheel cylinder in a second position thereof and to hold the fluid pressure in said wheel cylinder constant in a third position thereof;
   a wheel speed sensor means for detecting the rotational speed of said vehicle wheel and producing sensor signal pulses separated by intervals;
   a timer means for producing timer signals having values representative of measured periods of time;
   a first means for sampling said timer signals in synchronism with said sensor signal pulses;
   a second means operatively connected with said first means for deriving wheel speed values from values of the sampled timer signals;
   a memory means operatively connected with said second means for storing at least the two most recently derived wheel speed values;
   a third means operatively connected to the memory means for receiving the stored derived wheel values for comparing the two most recently derived wheel speed values and producing a fault signal when the difference therebetween is greater than a predetermined value which is variable depending on the older wheel speed value among said two most recently derived wheel speed values;
   means operatively connected with said third means for deriving said predetermined value based on said older wheel speed value;
   a fourth means responsive to said fault signal for deriving a back-up signal having a value representative of an estimated actual wheel speed value and replacing the most recently derived wheel speed value with said back-up value; and
   a fifth means responsive to said wheel speed values and values of said sampled timer signals for producing a control signal which actuates said pressure control valve to one of said first, second and third positions so as to adjust the wheel rotational speed toward an optimal relationship with vehicle speed.

2. The anti-skid brake control system as set forth in claim 1, wherein said back-up signal produced by said fourth means has a value corresponding to said older wheel speed value.

3. The anti-skid brake control system as set forth in claim 1, wherein said back-up signal value is derived based on said older wheel speed value and an assumed wheel speed variation within an interval between said two most recently produced sensor signal pulses corresponding to said two most recently derived wheel speed values.

4. The anti-skid brake control system as set forth in claim 3, wherein in order to derive said assumfed wheel speed variation, a wheel acceleration and deceleration is derived at a time corresponding to said time of derivation of said older wheel speed value.

5. The anti-skid brake control system as set forth in claim 2, wherein said fourth means is responsive to a subsequent fault signal for replacing said back-up signal with the most recently derived wheel speed value.

6. The anti-skid brake control system as set forth in claim 4, wherein said fourth means is responsive to a subsequent fault signal for replacing said back-up signal with the most recently derived wheel speed value.

7. An anti-skid brake control system for a hydraulic automotive brake system, comprising:
   a hydraulic circuit including a wheel cylinder for applying braking force;
   a pressure control valve disposed within said hydraulic circuit and controlling fluid pressure to be applied to said wheel cylinder, said pressure control valve being operative to increase said fluid pressure in said wheel cylinder at a first position thereof to decrease the fluid pressure in said wheel cylinder at a second position thereof, and to maintain the fluid pressure in said wheel cylinder at substantially constant pressure at a third position thereof;

a wheel speed sensor producing a pulse train form sensor signals having intervals variable corresponding to variations of wheel speed;

a timer means for producing timer signals having values representative of measured periods of time;

a first means for sampling said timer signals as input time data in synchronism with said sensor signals;

a second means for performing an arithmetic operation based on said input time data for deriving wheel speeds corresponding to said intervals of said sensor signals and outputting wheel speed data everytime said arithmetic operation is finished;

a memory means, operatively connected with said second means for storing said wheel speed data, said memory means having a first memory for storing said wheel speed data derived from a current cycle of said arithmetic operation and a second memory adapted to store said wheel speed data derived at an immediately preceding cycle of said arithmetic operation, and said memory means adapted to transfer the current wheel speed data derived at the current arithmetic operation and stored in said first memory to said second memory upon output of the wheel speed data from said second means;

a third means operatively connected to said memory means for calculating a difference between said current wheel speed data and the wheel speed data derived at said immediately preceding cycle of arithmetic operation, comparing the derived difference with a predetermined value, and producing a fault signal when said difference is greater than said predetermined value;

means, operatively connected with said third means, for deriving said predetermined value which is variable depending upon the wheel speed data derived at the immediately preceding cycle of arithmetic operation;

a fourth means, responsive to said fault signal, for producing a back-up signal having a value representative of an assumed wheel speed and free of any error component contained in said derived wheel speed data; and a fifth means for deriving a control signal to control said pressure control valve at one of said first, second and third positions so that a slip rate of said wheel speed is maintained within a given slip rate range for optimizing braking characteristics, said fifth means being responsive to said input time data from said first means and wheel speed data from said second means for selecting one of said first, second and third positions for deriving said control signal representative of the selected pressure control valve position.

8. The anti-skid brake control system as set forth in claim 7, wherein said fourth means produces the back-up signal having a value substantially corresponding to said immediate preceding wheel speed data.

9. The anti-skid brake control system as set forth in claim 7, wherein said fourth means is operatively connected with a sixth means which performs an arithmetic operation for deriving a wheel acceleration and deceleration based on said input time data and stores the derived wheel acceleration and deceleration, said fourth means receiving wheel acceleration or deceleration data derived at a time corresponding to the deriving of said immediate preceding wheel speed data from said sixth means for performing calculation of said back-up signal value based on said received wheel acceleration or deceleration and said immediate preceding wheel speed data.

10. The anti-skid brake control system as set forth in claim 8, wherein said fourth means is responsive to said fault signal for outputting said back-up signal and is responsive to a subsequent fault signal for outputting the wheel speed data derived at a current cycle of said arithmetic operation.

11. The anti-skid brake control system as set forth in claim 9, wherein said fourth means is responsive to said fault signal for outputting said back-up signal and is responsive to a subsequent fault signal for outputting the wheel speed data derived at a current cycle of said arithmetic operation.

12. The anti-skid brake control system as set forth in claim 10, wherein said fourth means comprises a backup command generator responsive to said fault signal to produce a back-up command, and a memory selector normally selecting said first memory for outputting wheel speed data stored in said first memory and responsive to said back-up command to select said second memory to output the wheel speed data therein.

13. The anti-skid brake control system as set forth in claim 11, wherein said fourth means comprises a back-up command generator responsive to said fault signal to produce a back-up command and a memory selector normally selecting said first memory for outputting wheel speed data stored in said first memory and responsive to said back-up command to select said second memory to output the wheel speed data therein.

14. In an anti-skid brake control for detecting slip rate of a wheel relative to a vehicle speed for controlling fluid pressure to a hydraulic brake system to increase, decrease or hold constant the fluid pressure, including means for detecting wheel peripheral speed to produce a pulse train form sensor signals, and means for deriving various control factors including a wheel speed for deriving control signal to control said hydraulic brake system to operate to increase, decrease or hold constant the fluid pressure to optimize vehicle braking characteristics, a method for deriving said wheel speed comprising the steps of:

detecting said sensor signals to produce interval indicative signals corresponding to the time intervals between said sensor signals;

deriving said wheel speed at given time based on said interval indicative signals;

storing the newly derived wheel speed in a memory as instant wheel speed data and storing the wheel speed data derived in the immediately preceding calculation as old wheel speed data;

comparing said instant and old wheel speed data to produce a fault signal whenever a difference of the instant and old wheel speed data exceeds a given threshold;

determining said given threshold based on the old wheel speed data; and outputting said instant wheel speed data while said fault signal is absent and outputting a back-up signal having a value corresponding to an approximated wheel speed without an error component in said instant wheel speed data while said fault signal is present.

15. The method as set forth in claim 14, wherein upon outputting a subsequent back-up signal said method includes the step of outputting said instant wheel speed data.

16. The method as set forth in claim 15, wherein said back-up signal has a value substantially corresponding to that of said old wheel speed data.

17. The method as set forth in claim 15, which further comprises a step of deriving wheel acceleration and deceleration based on said interval indicative signals and storing subsequently derived wheel acceleration and deceleration data as instant and old acceleration and deceleration data, and said back-up signal value is derived based on said old wheel speed and the corresponding acceleration and deceleration data.

18. The method as set forth in claim 17, wherein a wheel speed variation within an interval of performing wheel speed calculation is derived based on said corresponding acceleration and deceleration data and said wheel speed variation is added to said old wheel speed for deriving said back-up signal value.

19. An anti-skid brake control system for an automotive brake system comprising:
a hydraulic brake circuit including a wheel cylinder for applying braking force to a vehicle wheel;
a pressure control valve disposed within said hydraulic circuit and operative to increase fluid pressure in said wheel cylinder in a first position and to decrease the fluid pressure in said wheel cylinder in a second position;
means for monitoring wheel speed and producing a wheel speed indicative signal;
means for producing a control signal based on said wheel speed indicative signal, said control signal actuating said pressure control valve to one of said first and second positions so as to adjust wheel rotation speed toward an optimal relationship with vehicle speed;
means for comparing a value of a currently produced wheel speed indicative signal with a value of the last produced wheel speed indicative signal and producing a fault signal when the difference therebetween is greater than a predetermined value which is variable depending upon the value of the last produced wheel speed indicative signal; and
means, responsive to said fault signal, for deriving a back-up signal having a value representative of an estimated actual wheel speed and replacing the currently produced wheel speed indicative signal with said back-up signal.

20. The anti-skid brake control system as set forth in claim 19, wherein said back-up signal deriving means derives the value of said back-up signal to be equal to the value of said last produced wheel speed indicative signal.

21. The anti-skid brake control system as set forth in claim 19, wherein said producing means includes means for calculating wheel speed at periodic intervals and wherein said back-up signal deriving means derives said back-up signal value based on said last produced wheel speed indicative signal value and an assumed wheel speed variation within an interval of calculation of wheel speed by said calculating means.

22. The anti-skid brake control system as set forth in claim 21, wherein said back-up signal deriving means derives said assumed wheel speed variation based on a wheel acceleration derived at a time corresponding to wheel speed calculation by said calculating means and said calculation interval.

23. The anti-skid brake control system as set forth in claim 19, wherein said back-up signal deriving means is responsive to a subsequent fault signal input while said back-up signal is produced, outputting the currently derived wheel speed indicative signal.

* * * * *